United States Patent
Takada et al.

(10) Patent No.: US 10,012,165 B2
(45) Date of Patent: Jul. 3, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Norifumi Takada, Shizuoka-ken (JP); Yasuyuki Takama, Gotemba (JP); Yuji Miyoshi, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 60 days.

(21) Appl. No.: 15/313,739

(22) PCT Filed: May 22, 2015

(86) PCT No.: PCT/IB2015/000893
§ 371 (c)(1),
(2) Date: Nov. 23, 2016

(87) PCT Pub. No.: WO2015/181623
PCT Pub. Date: Dec. 3, 2015

(65) Prior Publication Data
US 2017/0101953 A1  Apr. 13, 2017

(30) Foreign Application Priority Data

May 26, 2014 (JP) .................. 2014-108424

(51) Int. Cl.
*F01N 3/00* (2006.01)
*F02D 41/14* (2006.01)
(Continued)

(52) U.S. Cl.
CPC ....... *F02D 41/1454* (2013.01); *F01N 3/0864* (2013.01); *F01N 3/101* (2013.01);
(Continued)

(58) Field of Classification Search
USPC ........... 60/274, 276, 277, 285; 701/103, 109
See application file for complete search history.

(56) References Cited

U.S. PATENT DOCUMENTS 6,226,982 B1   5/2001  Poggio et al.
7,117,665 B2 * 10/2006  Kamoto .................. F01N 3/101
                                                    60/277
(Continued)

FOREIGN PATENT DOCUMENTS

EP    1331384 A2   7/2003
JP    4-81539 A    3/1992
(Continued)

*Primary Examiner* — Binh Q Tran
(74) *Attorney, Agent, or Firm* — Sughrue Mion, PLLC

(57) ABSTRACT

A control device for an internal combustion engine is provided. The control device includes an electronic control unit. The electronic control unit is configured to set a target air-fuel ratio to a rich air-fuel ratio from a time at which fuel cut control for terminating fuel supply to a combustion chamber during operation of the internal combustion engine is terminated to a time at which an output air-fuel ratio of a downstream-side air-fuel ratio sensor becomes a rich determination air-fuel ratio or lower, temporarily set the target air-fuel ratio to the rich air-fuel ratio after the output air-fuel ratio of the downstream-side air-fuel ratio sensor becomes the rich determination air-fuel ratio or lower, and thereafter set the target air-fuel ratio to a lean air-fuel ratio.

13 Claims, 18 Drawing Sheets

(51) Int. Cl.
*F01N 3/20* (2006.01)
*F01N 3/08* (2006.01)
*F01N 11/00* (2006.01)
*F01N 3/10* (2006.01)
*F02D 41/30* (2006.01)

(52) U.S. Cl.
CPC .............. *F01N 3/20* (2013.01); *F01N 11/007* (2013.01); *F02D 41/3005* (2013.01); *F01N 2570/10* (2013.01); *F01N 2570/12* (2013.01); *F01N 2570/14* (2013.01); *F01N 2900/1402* (2013.01)

(56) References Cited

U.S. PATENT DOCUMENTS

| | | | | |
|---|---|---|---|---|
| 7,198,952 | B2* | 4/2007 | Uchida | B01D 53/9495 422/108 |
| 7,513,105 | B2* | 4/2009 | Kato | F01N 3/0864 123/672 |
| 7,918,085 | B2* | 4/2011 | Yoshioka | F01N 3/206 60/274 |
| 8,756,914 | B2* | 6/2014 | Nakano | F01N 9/005 60/276 |
| 8,899,019 | B2* | 12/2014 | Onoe | F02D 41/1401 60/276 |
| 2003/0159434 | A1 | 8/2003 | Ikemoto et al. | |
| 2008/0097680 | A1 | 4/2008 | Yoshioka | |
| 2015/0330323 | A1 | 11/2015 | Aoki | |
| 2016/0061084 | A1 | 3/2016 | Okazaki et al. | |

FOREIGN PATENT DOCUMENTS

| | | |
|---|---|---|
| JP | 2005-264751 A | 9/2005 |
| JP | 2006-194118 A | 7/2006 |
| JP | 2008-121530 A | 5/2008 |
| JP | 2009-036117 A | 2/2009 |
| JP | 2010-185382 A | 8/2010 |
| JP | 2011-069337 A | 4/2011 |
| JP | 2013-024131 A | 2/2013 |
| JP | 5360312 B1 | 9/2013 |
| WO | 2005/054651 A1 | 6/2005 |
| WO | 2014/118892 A1 | 8/2014 |

* cited by examiner

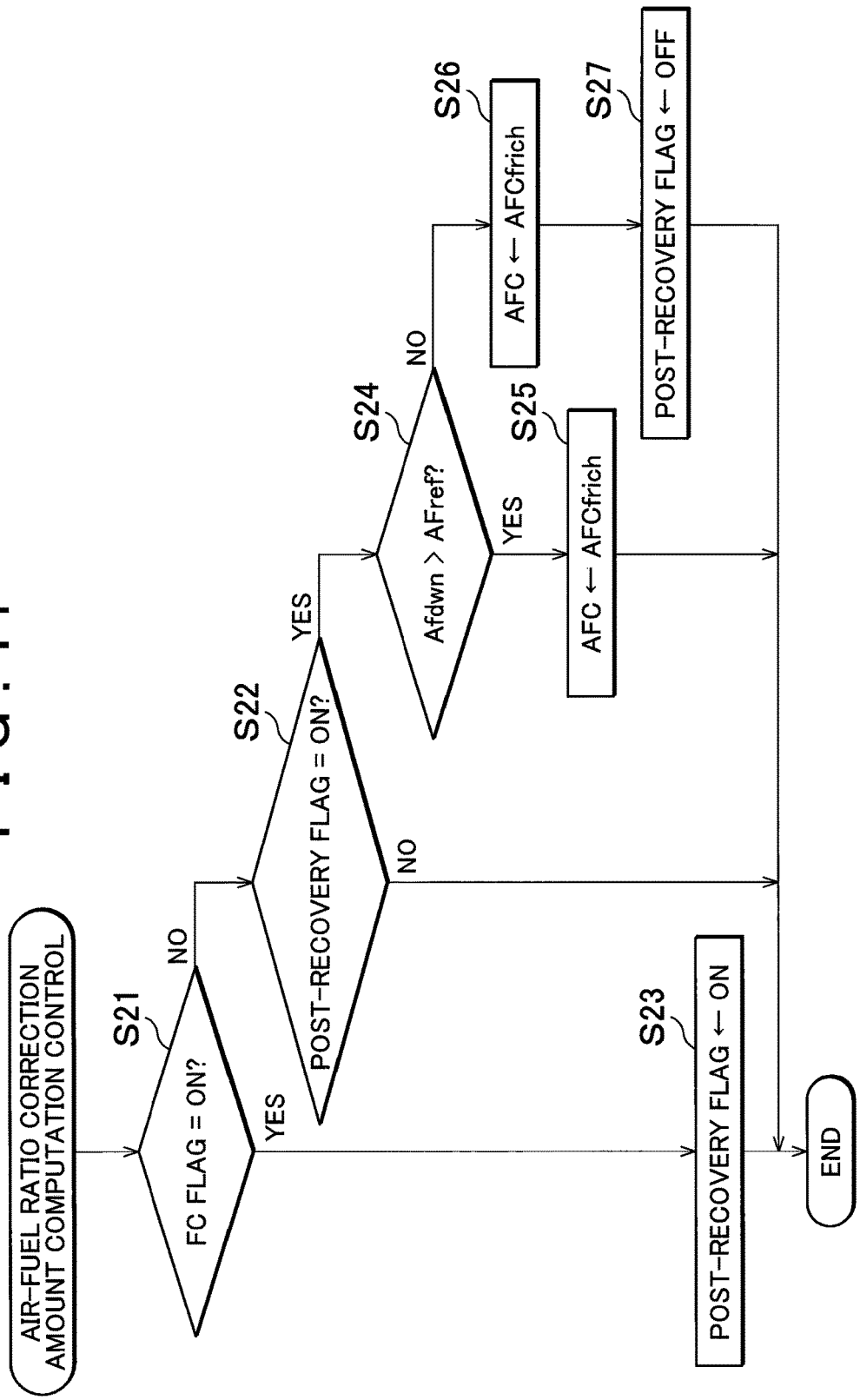

F I G . 16A
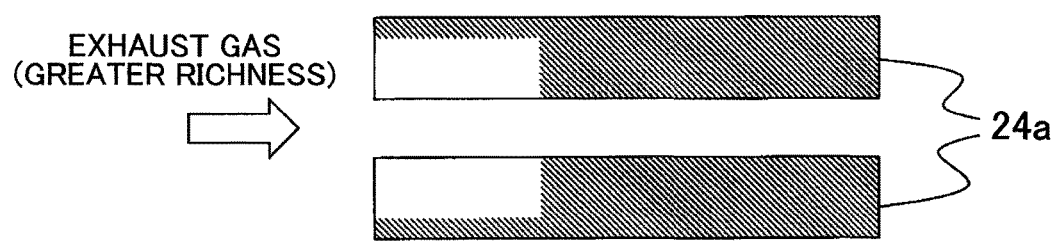
F I G . 16B
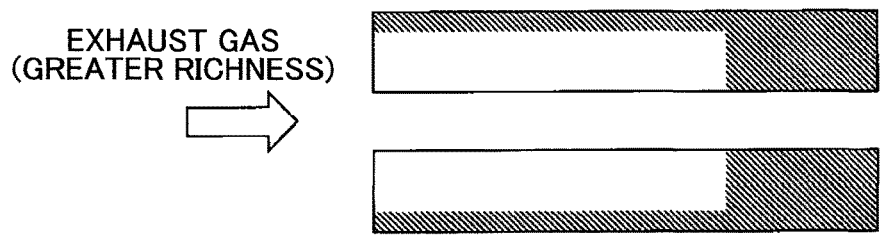

CONTROL DEVICE FOR INTERNAL COMBUSTION ENGINE

BACKGROUND OF THE INVENTION

1. Field of the Invention

The invention relates to a control device for an internal combustion engine.

2. Description of Related Art

Conventionally, an internal combustion engine in which an upstream-side exhaust gas control catalyst is provided in an exhaust passage of the internal combustion engine and a downstream-side exhaust gas control catalyst is provided in the exhaust passage on a downstream side of this upstream-side exhaust gas control catalyst in an exhaust gas flowing direction has widely been known (for example, Japanese Patent Application Publication No. 2011-069337 (JP 2011-069337 A)). Generally, an exhaust gas control catalyst that has an oxygen storage capacity is used in such an internal combustion engine.

When an oxygen storage amount is an appropriate amount between a maximum oxygen storable amount (an upper limit storage amount) and zero (a lower limit storage amount), the exhaust gas control catalyst that has the oxygen storage capacity can purify unburned gas (HC, CO, and the like), NOx, and the like in exhaust gas that flows into the exhaust gas control catalyst. In other words, when the exhaust gas at an air-fuel ratio that is richer than the theoretical air-fuel ratio (hereinafter also referred to as a "rich air-fuel ratio") flows into the exhaust gas control catalyst, the unburned gas in the exhaust gas is oxidized and purified by oxygen that is stored in the exhaust gas control catalyst. On the contrary, when the exhaust gas at an air-fuel ratio that is leaner than the theoretical air-fuel ratio (hereinafter also referred to as a "lean air-fuel ratio") flows into the exhaust gas control catalyst, oxygen in the exhaust gas is stored in the exhaust gas control catalyst. In this way, a surface of the exhaust gas control catalyst is brought into an oxygen deficient condition, and, in conjunction with this, NOx in the exhaust gas is reduced and purified. As a result, as long as the oxygen storage amount is the appropriate amount, the exhaust gas control catalyst can purify the exhaust gas regardless of the air-fuel ratio of the exhaust gas that flows into the exhaust gas control catalyst.

In view of the above, in a control device for such an internal combustion engine, in order to maintain the oxygen storage amount in the exhaust gas control catalyst at the appropriate amount, an air-fuel ratio sensor is provided on an upstream side of the upstream-side exhaust gas control catalyst in the exhaust gas flowing direction, and an oxygen sensor is provided on the downstream side thereof in the exhaust gas flowing direction. The control device uses these sensors to execute the feedback control on the basis of output of the air-fuel ratio sensor on the upstream side such that output of this air-fuel ratio sensor becomes a target value that corresponds to a target air-fuel ratio. In addition, the control device corrects the target value of the air-fuel ratio sensor on the upstream side on the basis of output of the oxygen sensor on the downstream side.

For example, in the control device described in JP 2011-069337 A, when output voltage of the oxygen sensor on the downstream side is a high-side threshold or larger and a state of the exhaust gas control catalyst is the oxygen deficient condition, the target air-fuel ratio of the exhaust gas that flows into the exhaust gas control catalyst is set to the lean air-fuel ratio. On the contrary, when the output voltage of the oxygen sensor on the downstream side is a low-side threshold or smaller and the state of the exhaust gas control catalyst is an oxygen excess condition, the target air-fuel ratio is set to the rich air-fuel ratio. According to JP 2011-069337 A, when the state of the exhaust gas control catalyst is the oxygen deficient condition or the oxygen excess condition, it is possible with such a configuration to promptly return the state of the exhaust gas control catalyst to an intermediate state between these states (that is, a state that an the appropriate amount of oxygen is stored in the exhaust gas control catalyst).

Meanwhile, in many internal combustion engines mounted in vehicles, fuel cut control for stopping a supply of fuel to a combustion chamber of the internal combustion engine is executed even during operation of the internal combustion engine. When such fuel cut control is executed, a large amount of oxygen flows into the upstream-side exhaust gas control catalyst and the downstream-side exhaust gas control catalyst.

Accordingly, when the fuel cut control is terminated, the oxygen storage amount of the upstream-side exhaust gas control catalyst reaches the maximum oxygen storable amount. Thus, the upstream-side exhaust gas control catalyst cannot store oxygen any more. For this reason, it has been suggested that, after the fuel cut control is terminated, the air-fuel ratio of the exhaust gas that flows into the upstream-side exhaust gas control catalyst is set to the rich air-fuel ratio so that oxygen is released from the upstream-side exhaust gas control catalyst (for example, Japanese Patent Application Publication No. 2009-036117 (JP 2009-036117 A), U.S. Pat. No. 6,226,982, Japanese Patent Application Publication No. 2013-024131 (JP 2013-024131 A), Japanese Patent Application Publication No. 2006-194118 (JP 2006-194118 A), and the like).

SUMMARY OF THE INVENTION

By the way, even when the control as described in above JP 2011-069337 A is executed, there is a case where NOx flows out of the upstream-side exhaust gas control catalyst. For example, even when the control described in JP 2011-069337 A is executed, a delay occurs from time at which the target air-fuel ratio is switched to time at which the air-fuel ratio of the exhaust gas that flows into the upstream-side exhaust gas control catalyst becomes the rich air-fuel ratio, and NOx possibly flows out of the upstream-side exhaust gas control catalyst in this delay period. In addition, the air-fuel ratio of the exhaust gas that flows into the upstream-side exhaust gas control catalyst temporarily fluctuates from the target air-fuel ratio in a great degree due to rapid acceleration of the internal combustion engine or the like, and, as a result, NOx possibly flows out of the upstream-side exhaust gas control catalyst.

Furthermore, as described above, when the two exhaust gas control catalysts of the upstream-side exhaust gas control catalyst and the downstream-side exhaust gas control catalyst are provided, the unburned gas (unburned HC, CO, and the like) that is not purified by the upstream-side exhaust gas control catalyst is purified by the downstream-side exhaust gas control catalyst. As a result, the unburned gas and NOx in the exhaust gas that is exhausted from the internal combustion engine can appropriately be purified.

However, after the fuel cut control is terminated, the oxygen storage amount of the downstream-side exhaust gas control catalyst is the maximum oxygen storable amount. Thus, if NOx flows out of the upstream-side exhaust gas control catalyst after the fuel cut control is terminated, as described above, there is a case where this NOx cannot be purified by the downstream-side exhaust gas control catalyst.

The invention provides a control device for an internal combustion engine that is equipped with two exhaust gas control catalysts having oxygen storage capacities, the control device suppressing NOx from remaining in exhaust gas that has flown through both of the exhaust gas control catalysts.

A control device for an internal combustion engine according to a first aspect of the invention is provided. The internal combustion engine includes an upstream-side exhaust gas control catalyst, a downstream-side exhaust gas control catalyst, and a downstream-side air-fuel ratio sensor. The upstream-side exhaust gas control catalyst is arranged in an exhaust passage of the internal combustion engine. The downstream-side exhaust gas control catalyst is arranged on a downstream side in an exhaust gas flowing direction of the upstream-side exhaust gas control catalyst in the exhaust passage of the internal combustion engine. The upstream-side exhaust gas control catalyst and the downstream-side exhaust gas control catalyst is configured to store oxygen. The downstream-side air-fuel ratio sensor is arranged on the downstream side in the exhaust gas flowing direction of the upstream-side exhaust gas control catalyst and on an upstream side in the exhaust gas flowing direction of the downstream-side exhaust gas control catalyst in the exhaust passage. The downstream-side air-fuel ratio sensor is configured to output a value of an air-fuel ratio of exhaust gas that flows out of the upstream-side exhaust gas control catalyst. The control device includes an electronic control unit. The electronic control unit is configured to: (a) control a fuel supply amount supplied to a combustion chamber of the internal combustion engine such that an air-fuel ratio of the exhaust gas that flows into the upstream-side exhaust gas control catalyst becomes a target air-fuel ratio; (b) set the target air-fuel ratio to a lean air-fuel ratio that is leaner than a theoretical air-fuel ratio from a time which an output air-fuel ratio of the downstream-side air-fuel ratio sensor becomes a rich determination air-fuel ratio that is richer than the theoretical air-fuel ratio or lower to a time which an oxygen storage amount of the upstream-side exhaust gas control catalyst becomes a specified switching reference storage amount that is smaller than a maximum oxygen storable amount thereof or larger, and set the target air-fuel ratio to a rich air-fuel ratio that is richer than the theoretical air-fuel ratio after the oxygen storage amount of the upstream-side exhaust gas control catalyst becomes the specified switching reference storage amount or larger; and (c) set the target air-fuel ratio to the rich air-fuel ratio from a time which fuel cut control for terminating fuel supply to the combustion chamber during operation of the internal combustion engine is terminated to a time which the output air-fuel ratio of the downstream-side air-fuel ratio sensor becomes the rich determination air-fuel ratio or lower, temporarily set the target air-fuel ratio to the rich air-fuel ratio after the output air-fuel ratio of the downstream-side air-fuel ratio sensor becomes the rich determination air-fuel ratio or lower, and thereafter set the target air-fuel ratio to the lean air-fuel ratio.

In the above first aspect, after the fuel cut control is terminated, the electronic control unit may be configured to set the target air-fuel ratio to the rich air-fuel ratio until the output air-fuel ratio of the downstream-side air-fuel ratio sensor that has become the rich determination air-fuel ratio or lower becomes a reference air-fuel ratio that is richer than the rich determination air-fuel ratio.

In the above first aspect, after the fuel cut control is terminated, the electronic control unit may be configured to set a time which the target air-fuel ratio is switched to the lean air-fuel ratio after temporarily setting the target air-fuel ratio to the rich air-fuel ratio on the basis of an elapsed period since predetermined time after the fuel cut control is terminated.

In the above first aspect, after the fuel cut control is terminated, the electronic control unit may be configured to set a time which the target air-fuel ratio is switched to the lean air-fuel ratio after temporarily setting the target air-fuel ratio to the rich air-fuel ratio on the basis of an integrated flow rate of the exhaust gas in the downstream-side exhaust gas control catalyst from the predetermined time after the fuel cut control is terminated.

In the above first aspect, after the fuel cut control is terminated, the electronic control unit may be configured to set a time which the target air-fuel ratio is switched to the lean air-fuel ratio after temporarily setting the target air-fuel ratio to the rich air-fuel ratio on the basis of an integrated deficient oxygen amount in the exhaust gas that flows into the downstream-side exhaust gas control catalyst from the predetermined time after the fuel cut control is terminated.

In the above first aspect, the target air-fuel ratio as the rich air-fuel ratio that is set after the fuel cut control is terminated may be a richer air-fuel ratio than the target air-fuel ratio as the rich air-fuel ratio that is set after the oxygen storage amount becomes the specified switching reference storage amount or larger.

A control device for an internal combustion engine according to a second aspect of the invention is provided. The internal combustion engine includes an upstream-side exhaust gas control catalyst, a downstream-side exhaust gas control catalyst, and a downstream-side air-fuel ratio sensor. The upstream-side exhaust gas control catalyst is arranged in an exhaust passage of the internal combustion engine. The downstream-side exhaust gas control catalyst is arranged downstream of the upstream-side exhaust gas control catalyst in an exhaust gas flowing direction in the exhaust passage of the internal combustion engine. The upstream-side exhaust gas control catalyst and the downstream-side exhaust gas control catalyst is configured to store oxygen. The downstream-side air-fuel ratio sensor is arranged downstream of the upstream-side exhaust gas control catalyst in the exhaust gas flowing direction and upstream of the downstream-side exhaust gas control catalyst in the exhaust gas flowing direction in the exhaust passage. The downstream-side air-fuel ratio sensor is configured to output a value of an air-fuel ratio of exhaust gas that flows out of the upstream-side exhaust gas control catalyst. The control device includes an electronic control unit. The electronic control unit is configured to: (d) control a fuel supply amount supplied to a combustion chamber of the internal combustion engine such that an air-fuel ratio of the exhaust gas that flows into the upstream-side exhaust gas control catalyst becomes a target air-fuel ratio; (e) alternately set the target air-fuel ratio to a rich air-fuel ratio that is richer than a theoretical air-fuel ratio and to a lean air-fuel ratio that is leaner than the theoretical air-fuel ratio when an output air-fuel ratio of the downstream-side air-fuel ratio sensor exceeds a rich determination air-fuel ratio that is richer than the theoretical air-fuel ratio, and set the target air-fuel ratio to the lean air-fuel ratio when the output air-fuel ratio of the downstream-side air-fuel ratio sensor becomes the rich determination air-fuel ratio or lower; and (f) set the target air-fuel ratio to the rich air-fuel ratio from a time which fuel cut control for terminating fuel supply to the combustion chamber during operation of the internal combustion engine is terminated to a time which the output air-fuel ratio of the downstream-side air-fuel ratio sensor becomes a reference air-fuel ratio that is richer than the rich determination air-fuel ratio or lower.

In the above second aspect, after the fuel cut control is terminated, the electronic control unit may be configured to change the target air-fuel ratio to a richer air-fuel ratio than an air-fuel ratio before a lapse of a specified period when the output air-fuel ratio of the downstream-side air-fuel ratio sensor does not become the reference air-fuel ratio or lower after the specified period has elapsed since the output air-fuel ratio of the downstream-side air-fuel ratio sensor reaches the rich determination air-fuel ratio.

In the above second aspect, after the fuel cut control is terminated, the electronic control unit may be configured to change, when the output air-fuel ratio of the downstream-side air-fuel ratio sensor becomes the reference air-fuel ratio or lower for the first time, the target air-fuel ratio to an air-fuel ratio that is leaner than an air-fuel ratio before the output air-fuel ratio of the downstream-side air-fuel ratio sensor becomes the reference air-fuel ratio or lower for the first time and that is richer than the theoretical air-fuel ratio.

In the above second aspect, the rich air-fuel ratio after a change may be a richer air-fuel ratio than the reference air-fuel ratio.

In the above second aspect, the target air-fuel ratio as the rich air-fuel ratio that is set after the fuel cut control is terminated may be a richer air-fuel ratio than the target air-fuel ratio as the rich air-fuel ratio that is set alternately with the lean air-fuel ratio.

According to the invention, in the internal combustion engine that is equipped with the two exhaust gas control catalysts having oxygen storage capacities, the control device for the internal combustion engine that can suppress NOx from remaining in the exhaust gas that has flown through both of the exhaust gas control catalysts is provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a flowchart of a control routine for computing the air-fuel ratio correction amount during post-recovery rich control;

FIG. 16A is a view for schematically showing a state of the downstream-side exhaust gas control catalyst when the exhaust gas at a substantially rich air-fuel ratio flows into the downstream-side exhaust gas control catalyst;

FIG. 16B is a view for schematically showing a state of the downstream-side exhaust gas control catalyst when the exhaust gas at the rich air-fuel ratio continuously flows into the downstream-side exhaust gas control catalyst;

DETAILED DESCRIPTION OF EMBODIMENTS

Figure 1:
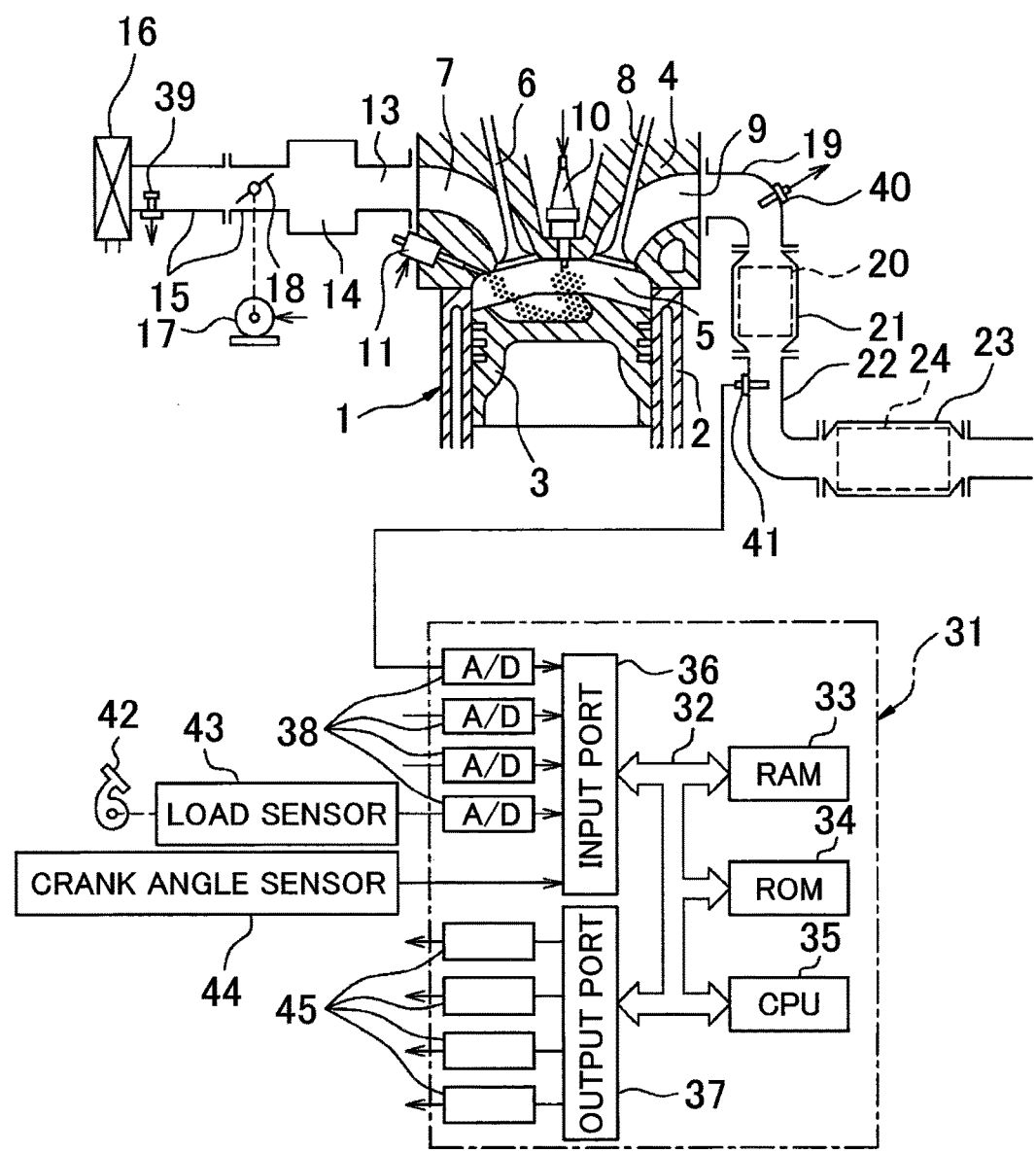
FIG. 1 is a view for schematically showing an internal combustion engine in which a control device of the invention is used.

A detailed description will hereinafter be made on embodiments of the invention with reference to the drawings. It should be noted that similar components are denoted by the same reference numerals in the following description.

FIG. 1 is a view for schematically showing an internal combustion engine in which a control device according to the invention is used. In FIG. 1, the reference numeral 1 indicates an engine body, the reference numeral 2 indicates a cylinder block, the reference numeral 3 indicates a piston that reciprocates in the cylinder block 2, the reference numeral 4 indicates a cylinder head that is fixed on the cylinder block 2, the reference numeral 5 indicates a combustion chamber that is formed between the piston 3 and the cylinder head 4, the reference numeral 6 indicates an intake valve, the reference numeral 7 indicates an intake port, the reference numeral 8 indicates an exhaust valve, and the reference numeral 9 indicates an exhaust port. The intake valve 6 opens/closes the intake port 7, and the exhaust valve 8 opens/closes the exhaust port 9.

As shown in FIG. 1, an ignition plug 10 is arranged at a central section of an inner wall surface of the cylinder head 4, and a fuel injection valve 11 is arranged in a peripheral section of the inner wall surface of the cylinder head 4. The ignition plug 10 is configured to generates sparks in accordance with an ignition signal. In addition, the fuel injection valve 11 injects fuel in a specified amount into the combustion chamber 5 in accordance with an injection signal. It should be noted that the fuel injection valve 11 may be arranged to inject the fuel into the intake port 7. In addition, in this embodiment, gasoline at the theoretical air-fuel ratio of 14.6 is used as the fuel. However, another type of the fuel may be used in the internal combustion engine of this embodiment.

The intake port 7 in each cylinder is coupled to a surge tank 14 via a corresponding intake branch pipe 13, and the surge tank 14 is coupled to an air cleaner 16 via an intake pipe 15. The intake port 7, the intake branch pipe 13, the surge tank 14, and the intake pipe 15 form an intake passage. In addition, a throttle valve 18 that is driven by a throttle valve driving actuator 17 is arranged in the intake pipe 15. The throttle valve 18 can change an opening area of the intake passage by being turned by the throttle valve driving actuator 17.

Meanwhile, the exhaust port 9 in the each cylinder is coupled to an exhaust manifold 19. The exhaust manifold 19 has: plural branch sections that are respectively coupled to the exhaust ports 9; and a collection section in which these branch sections are collected. The collection section of the exhaust manifold 19 is coupled to an upstream-side casing 21 in which an the upstream-side exhaust gas control catalyst 20 is mounted. The upstream-side casing 21 is coupled to a downstream-side casing 23 in which a the downstream-side exhaust gas control catalyst 24 is mounted via an exhaust pipe 22. The exhaust port 9, the exhaust manifold 19, the upstream-side casing 21, the exhaust pipe 22, and the downstream-side casing 23 form an exhaust passage.

An electronic control unit (ECU) 31 is formed of a digital computer and equipped with: a random access memories (RAM) 33 that are mutually connected via a bidirectional bus 32, a read only memory (ROM) 34, a microprocessor (CPU) 35, an input port 36, and an output port 37. An airflow meter 39 for detecting an air flow rate that flows through the intake pipe 15 is arranged in the intake pipe 15, and output of this airflow meter 39 is input to the input port 36 via a corresponding AD converter 38. In addition, an upstream-side air-fuel ratio sensor (an upstream-side air-fuel ratio detector) 40 for detecting an air-fuel ratio of exhaust gas that flows through the exhaust manifold 19 (that is, exhaust gas that flows into the upstream-side exhaust gas control catalyst 20) is arranged in the collection section of the exhaust manifold 19. Furthermore, a downstream-side air-fuel ratio sensor (a downstream-side air-fuel ratio detector) 41 for detecting an air-fuel ratio of the exhaust gas that flows through the exhaust pipe 22 (that is, the exhaust gas that flows out of the upstream-side exhaust gas control catalyst 20 and flows into the downstream-side exhaust gas control catalyst 24) is arranged in the exhaust pipe 22. Output of each of these air-fuel ratio sensors 40, 41 is also input to the input port 36 via the corresponding AD converter 38.

Moreover, a load sensor 43 for generating output voltage that is proportional to an depressing amount of an accelerator pedal 42 is connected to the accelerator pedal 42, and the output voltage of the load sensor 43 is input to the input port 36 via the corresponding AD converter 38. A crank angle sensor 44 generates an output pulse every time a crankshaft rotates by 15 degrees, for example, and this output pulse is input to the input port 36. In the CPU 35, an engine speed is calculated from this output pulse of the crank angle sensor 44. Meanwhile, the output port 37 is connected to the ignition plug 10, the fuel injection valve 11, and the throttle valve driving actuator 17 via a corresponding drive circuit 45. It should be noted that the ECU 31 functions as the control device for executing control of the internal combustion engine.

It should be noted that the internal combustion engine according to this embodiment is a non-supercharged internal combustion engine run by gasoline as the fuel. However, a configuration of the internal combustion engine according to the invention is not limited to the above configuration. For example, the internal combustion engine according to the invention may differ from the above internal combustion engine in terms of cylinder arrangement, a fuel injection mode, configurations of intake and exhaust systems, a configuration of a valve mechanism, presence or absence of a supercharger, a supercharging mode, and the like.

The upstream-side exhaust gas control catalyst 20 and the downstream-side exhaust gas control catalyst 24 has similar configurations. Each of the exhaust gas control catalysts 20, 24 is a three-way catalyst that has an the oxygen storage capacity. More specifically, in each of the exhaust gas control catalysts 20, 24, noble metal that exhibits a catalytic action (for example, platinum (Pt)) and a substance that has the oxygen storage capacity (for example, ceria ($CeO_2$)) are carried on a base material formed of ceramic. Once reaching a specified activating temperature, the exhaust gas control catalysts 20, 24 exerts the oxygen storage capacity in addition to the catalytic action for simultaneously purifying the unburned gas (HC, CO, and the like) and nitrogen oxide (NOx).

As for the oxygen storage capacities of the exhaust gas control catalysts 20, 24, when the air-fuel ratio of the exhaust gas that flows into the exhaust gas control catalysts 20, 24 is leaner than the theoretical air-fuel ratio (a lean air-fuel ratio), the exhaust gas control catalysts 20, 24 store oxygen in the exhaust gas. On the contrary, when the air-fuel ratio of the exhaust gas that flows into the exhaust gas control catalysts 20, 24 is richer than the theoretical air-fuel ratio (a rich air-fuel ratio), the exhaust gas control catalysts 20, 24 release oxygen that is stored in the exhaust gas control catalysts 20, 24.

Figure 2A:
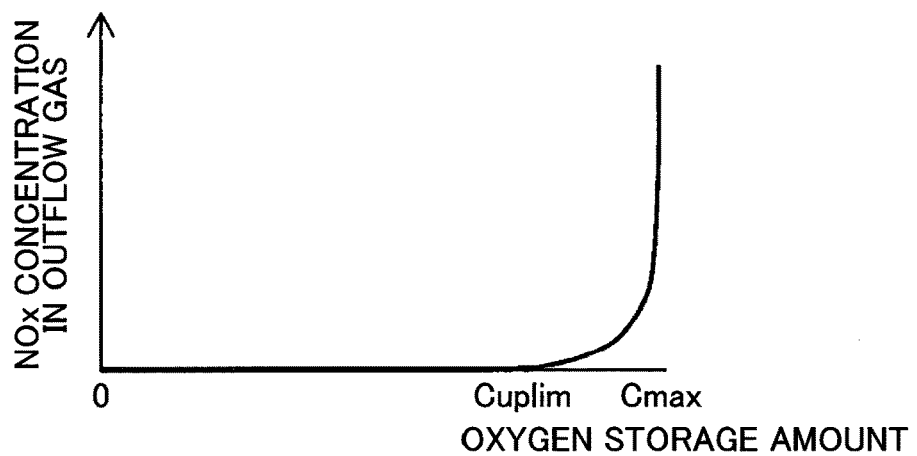
FIG. 2A is a graph of a relationship between an oxygen storage amount of an exhaust gas control catalyst and an NOx concentration in exhaust gas that flows out of the exhaust gas control catalyst.

Since each of the exhaust gas control catalysts 20, 24 has the catalytic action and the oxygen storage capacity, each of the exhaust gas control catalysts 20, 24 exhibits a purifying action of NOx and the unburned gas in accordance with an oxygen storage amount. In other words, as shown in FIG. 2A, in the case where the air-fuel ratio of the exhaust gas that flows into the exhaust gas control catalysts 20, 24 is the lean air-fuel ratio and where the oxygen storage amount is small, the oxygen in the exhaust gas is stored by the exhaust gas control catalysts 20, 24. In conjunction with this, NOx in the exhaust gas is reduced and purified. Meanwhile, when the oxygen storage amount is increased, an amount of oxygen in the exhaust gas that flows out of the exhaust gas control catalysts 20, 24 and an NOx concentration are increased abruptly beyond a certain storage amount in the vicinity of a maximum oxygen storable amount Cmax (Cuplim in the drawing).

Figure 2B:
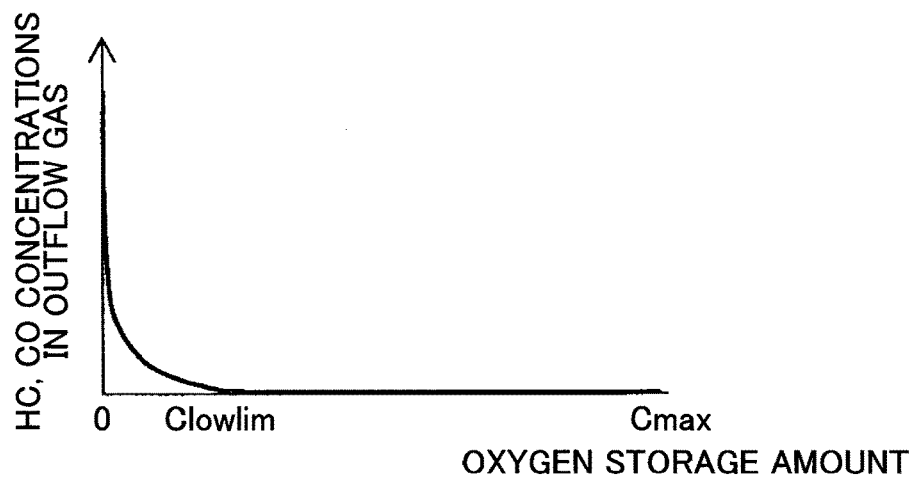
FIG. 2B is a graph of a relationship between the oxygen storage amount of the exhaust gas control catalyst and HC, CO concentrations in the exhaust gas that flows out of the exhaust gas control catalyst.

On the contrary, as shown in FIG. 2B, in the case where the air-fuel ratio of the exhaust gas that flows into the exhaust gas control catalysts 20, 24 is the rich air-fuel ratio and where the oxygen storage amount is large, oxygen that is stored in the exhaust gas control catalysts 20, 24 is released, and the unburned gas in the exhaust gas is oxidized and purified. Meanwhile, when the oxygen storage amount is reduced, an unburned gas concentration in the exhaust gas that flows out of the exhaust gas control catalysts 20, 24 is abruptly increased beyond a certain storage amount in the vicinity of zero (Clowlim in the drawing).

As described above, as for the exhaust gas control catalysts 20, 24 that are used in this embodiment, purifying properties of NOx and the unburned gas in the exhaust gas change in accordance with the air-fuel ratio of the exhaust gas that flows into the exhaust gas control catalysts 20, 24 and the oxygen storage amount. It should be noted that each of the exhaust gas control catalysts 20, 24 may be a catalyst that differs from the three-way catalyst as long as each of the exhaust gas control catalysts 20, 24 has the catalytic action and the oxygen storage capacity.

Figure 3:
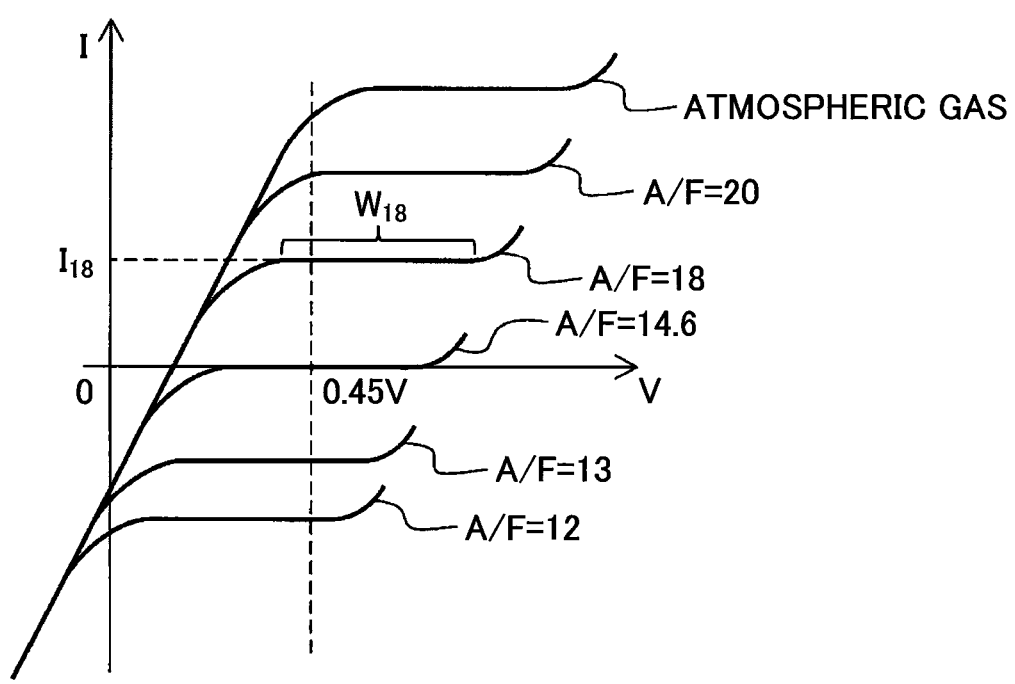
FIG. 3 is a graph of a relationship between sensor applied voltage and output current at each exhaust gas air-fuel ratio.
Figure 4:
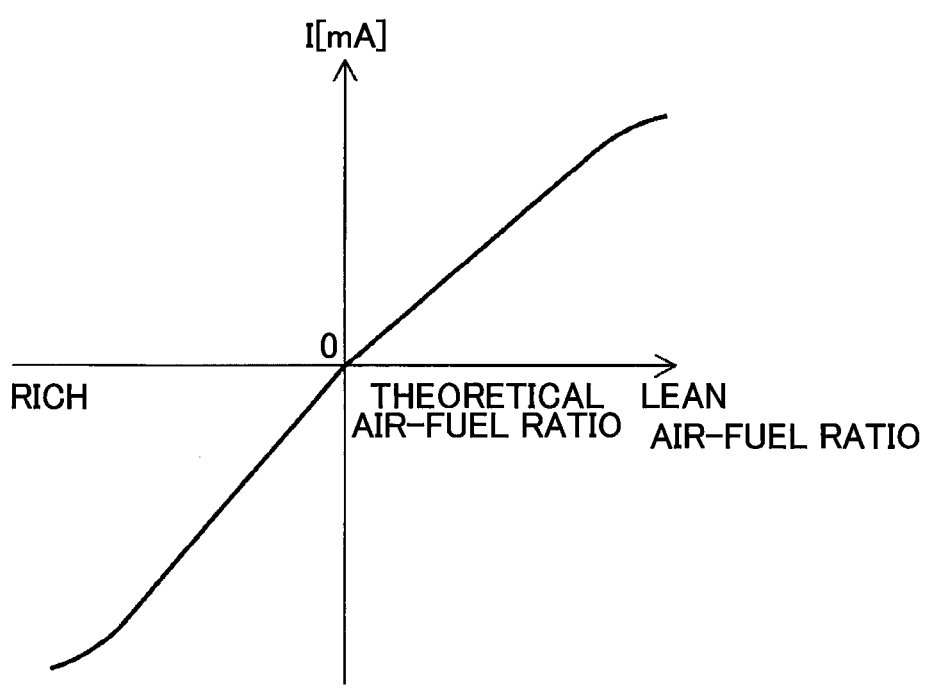
FIG. 4 is a graph of a relationship between the exhaust gas air-fuel ratio and the output current when the sensor applied voltage is set to be constant.

Next, a description will be made on output properties of the air-fuel ratio sensors 40, 41 in this embodiment with reference to FIG. 3 and FIG. 4. FIG. 3 is a graph of a voltage-current (V-I) property of each of the air-fuel ratio sensors 40, 41 in this embodiment, and FIG. 4 is a graph of a relationship between the air-fuel ratio of the exhaust gas that is distributed around the air-fuel ratio sensors 40, 41 (hereinafter referred to as an "the exhaust gas air-fuel ratio") and output current I when applied voltage is maintained to be constant. It should be noted that air-fuel ratio sensors with the same configuration are used as the air-fuel ratio sensors 40, 41 in this embodiment.

As it can be understood from FIG. 3, the output current I is increased in the air-fuel ratio sensors 40, 41 of this embodiment as the exhaust gas air-fuel ratio is increased (becomes leaner). Meanwhile, in a V-I line of the each exhaust gas air-fuel ratio, a region that is substantially parallel with a V-axis, that is, a region in which the output current is hardly changed even when a sensor applied voltage is changed exists. This voltage region is referred to as a limiting current area, and the current at this time is referred to as limiting current. In FIG. 3, the limiting current area and the limiting current at time when the exhaust gas air-fuel ratio is 18 are respectively indicated by $W_{18}$ and $I_{18}$. Thus, it can be said that each of the air-fuel ratio sensors 40, 41 is an air-fuel ratio sensor of limiting current type.

FIG. 4 is the graph of the relationship between the exhaust gas air-fuel ratio and the output current I when the applied voltage is maintained at about 0.45 V. As it can be understood from FIG. 4, in each of the air-fuel ratio sensors 40, 41, the output current is changed linearly with respect to (in proportion to) the exhaust gas air-fuel ratio such that the output current I from each of the air-fuel ratio sensors 40, 41 is increased as the exhaust gas air-fuel ratio is increased (that is, becomes leaner). In addition, the air-fuel ratio sensors 40, 41 are configured such that the output current I becomes zero when the exhaust gas air-fuel ratio is the theoretical air-fuel ratio. Furthermore, a ratio of change of the output current with respect to the exhaust gas air-fuel ratio is reduced when the exhaust gas air-fuel ratio becomes a certain value or larger or becomes a certain value or smaller.

It should be noted that the air-fuel ratio sensors of limiting current type are used as the air-fuel ratio sensors 40, 41 in the above example. However, any type of the air-fuel ratio sensors, such as air-fuel ratio sensors that are not the limiting current type, may be used as the air-fuel ratio sensors 40, 41 as long as the output current is changed linearly with respect to the exhaust gas air-fuel ratio. In addition, the air-fuel ratio sensors 40, 41 may be air-fuel ratio sensors, structures of which differ from each other.

Next, a description will be made on a basic outline of air-fuel ratio control in the control device for the internal combustion engine of this embodiment. In the air-fuel ratio control of this embodiment, the feedback control for controlling a fuel injection amount from the fuel injection valve 11 is executed on the basis of an output air-fuel ratio of the upstream-side air-fuel ratio sensor 40 such that the output air-fuel ratio of the upstream-side air-fuel ratio sensor 40 becomes a target air-fuel ratio. It should be noted that the "output air-fuel ratio" means an air-fuel ratio that corresponds to an output value of the air-fuel ratio sensor.

Meanwhile, in the air-fuel ratio control of this embodiment, target air-fuel ratio setting control for setting the target air-fuel ratio is executed on the basis of an output air-fuel ratio of the downstream-side air-fuel ratio sensor 41 and the like. In the target air-fuel ratio setting control, when the output air-fuel ratio of the downstream-side air-fuel ratio sensor 41 becomes the rich air-fuel ratio, the target air-fuel ratio is set to a lean setting air-fuel ratio and is maintained at this air-fuel ratio thereafter. Here, the lean setting air-fuel ratio is a predetermined air-fuel ratio that is leaner than the theoretical air-fuel ratio (an air-fuel ratio as control center) to a certain degree, and is, for example, about 14.65 to 20, preferably about 14.65 to 18, and further preferably about 14.65 to 16. In addition, the lean setting air-fuel ratio can be expressed as an air-fuel ratio that is obtained by adding a lean correction amount to the air-fuel ratio as the control center (the theoretical air-fuel ratio in this embodiment). Furthermore, in this embodiment, when the output air-fuel ratio of the downstream-side air-fuel ratio sensor 41 becomes a rich determination air-fuel ratio (for example, 14.55) or lower that is slightly richer than the theoretical air-fuel ratio, it is determined that the output air-fuel ratio of the downstream-side air-fuel ratio sensor 41 becomes the rich air-fuel ratio.

When the target air-fuel ratio is changed to the lean setting air-fuel ratio, an excess/deficient oxygen amount in the exhaust gas that flows into the upstream-side exhaust gas control catalyst 20 is integrated. The excess/deficit oxygen amount means an amount of oxygen that becomes excessive or deficit (an excess amount of the unburned gas and the like) when it is intended to set the air-fuel ratio of the exhaust gas that flows into the upstream-side exhaust gas control catalyst 20 to the theoretical air-fuel ratio. In particular, when the target air-fuel ratio is the lean setting air-fuel ratio, oxygen in the exhaust gas that flows into the upstream-side exhaust gas control catalyst 20 becomes excessive, and this excess oxygen is stored in the upstream-side exhaust gas control catalyst 20. Thus, it can be said that an oxygen storage amount OSAsc of the upstream-side exhaust gas control catalyst 20 is expressed by an integrated value of the excess/deficiency oxygen amount (hereinafter referred to as an "integrated excess/deficient oxygen amount").

It should be noted that the excess/deficient oxygen amount is computed on the basis of the output air-fuel ratio of the upstream-side air-fuel ratio sensor 40, one of a flow rate of the exhaust gas that is distributed to the upstream-side exhaust gas control catalyst 20 and a fuel supply amount from the fuel injection valve 11, and the like. More specifically, an excess/deficient oxygen amount OEDsc in the exhaust gas that flows into the upstream-side exhaust gas control catalyst 20 is computed by the following equation (1), for example.

$$OEDsc = 0.23 \cdot Qi/(AFup - AFR) \tag{1}$$

Here, 0.23 represents an oxygen concentration in the air, Qi represents the fuel injection amount, AFup represents the output air-fuel ratio of the upstream-side air-fuel ratio sensor 40, and AFR represents the air-fuel ratio as the control center (the theoretical air-fuel ratio in this embodiment). It should be noted that the flow rate of the exhaust gas that is distributed to the upstream-side exhaust gas control catalyst 20 is computed, for example, on the basis of an intake air amount into the combustion chamber 5 that is computed on the basis of the output of the airflow meter 39 or the like. Thus, it can also be said that the excess/deficient oxygen amount OEDsc is computed on the basis of the intake air amount into the combustion chamber 5.

When the integrated excess/deficient oxygen amount that is obtained by integrating the thus-computed excess/deficient oxygen amount becomes a predetermined switching reference value (corresponds to a predetermined switching reference storage amount Cref) or larger, the target air-fuel ratio that has been set to the lean setting air-fuel ratio is set to a rich setting air-fuel ratio and is maintained at this air-fuel ratio thereafter.

The rich setting air-fuel ratio is a predetermined air-fuel ratio that is richer than the theoretical air-fuel ratio (the air-fuel ratio as the control center) to a certain degree, and is, for example, about 12 to 14.58, preferably about 13 to 14.57, and further preferably about 14 to 14.55. In addition, the rich setting air-fuel ratio can be expressed as an air-fuel ratio that is obtained by subtracting a rich correction amount from the air-fuel ratio as the control center (the theoretical air-fuel ratio in this embodiment). It should be noted that, in this embodiment, a difference of the rich setting air-fuel ratio from the theoretical air-fuel ratio (a richness degree) is equal to or smaller than a difference of the lean setting air-fuel ratio from the theoretical air-fuel ratio (a leanness degree).

Thereafter, when the output air-fuel ratio of the downstream-side air-fuel ratio sensor 41 becomes the rich determination air-fuel ratio or lower again, the target air-fuel ratio is set to the lean setting air-fuel ratio again. Then, a similar operation is repeated. Just as described, in this embodiment, the target air-fuel ratio of the exhaust gas that flows into the upstream-side exhaust gas control catalyst 20 is alternately set to the lean setting air-fuel ratio and the rich setting air-fuel ratio.

Figure 5:
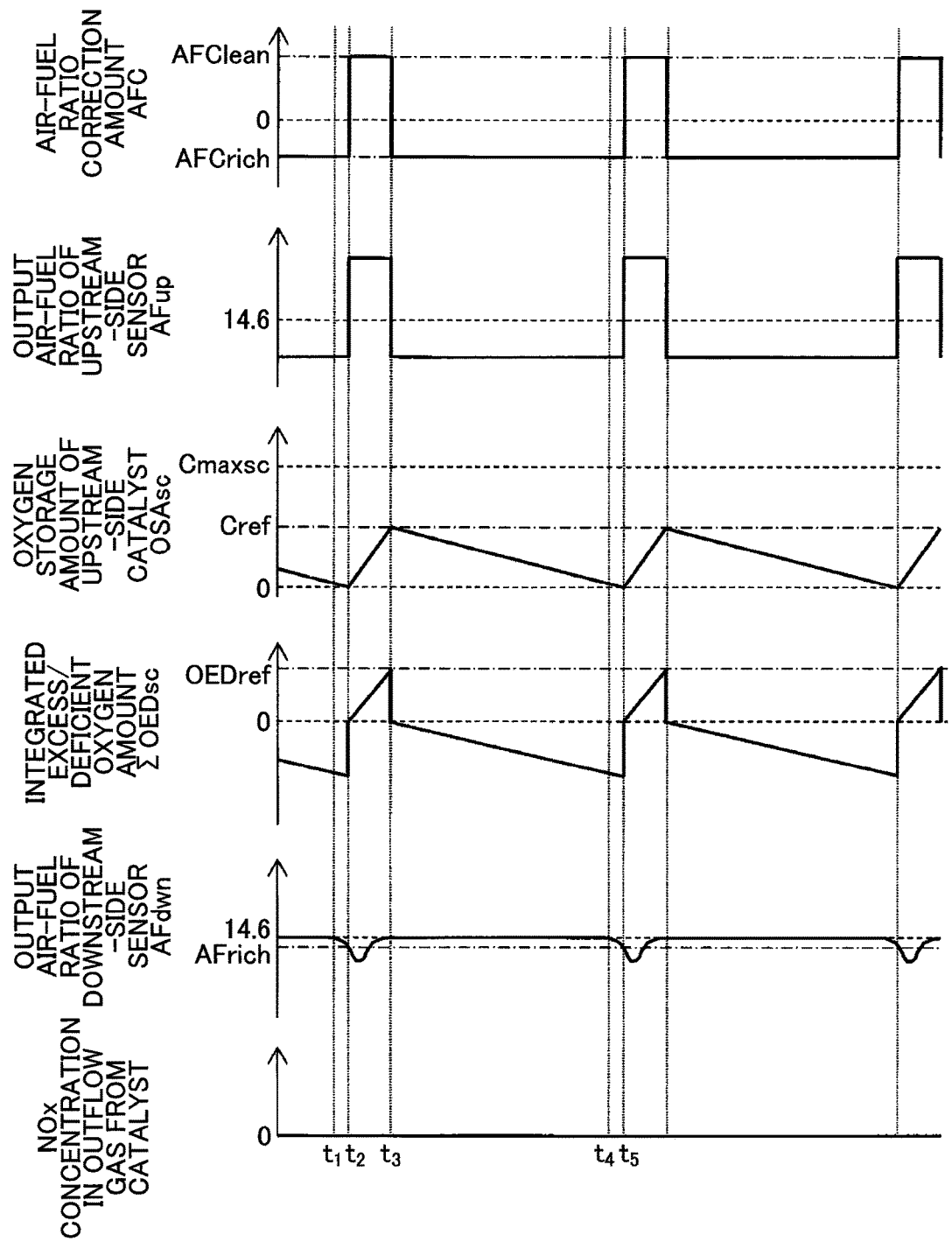
FIG. 5 is a time chart of an air-fuel ratio correction amount and the like when air-fuel ratio control is executed.

A specific description will be made on an operation as described above with reference to FIG. 5. FIG. 5 is a time chart of an air-fuel ratio correction amount AFC, an output air-fuel ratio AFup of the upstream-side air-fuel ratio sensor 40, an oxygen storage amount OSAsc of the upstream-side exhaust gas control catalyst 20, an integrated excess/deficient oxygen amount ΣOEDsc in the exhaust gas that flows into the upstream-side exhaust gas control catalyst 20, an output air-fuel ratio AFdwn of the downstream-side air-fuel ratio sensor 41, and an NOx concentration in the exhaust gas that flows out of the upstream-side exhaust gas control catalyst 20 when the air-fuel ratio control of this embodiment is executed.

It should be noted that the air-fuel ratio correction amount AFC is a correction amount that is related to the target air-fuel ratio of the exhaust gas that flows into the upstream-side exhaust gas control catalyst 20. When the air-fuel ratio correction amount AFC is zero, the target air-fuel ratio is set to an air-fuel ratio (the theoretical air-fuel ratio in this embodiment) that is equal to the air-fuel ratio as the control center (hereinafter referred to as a "control center air-fuel ratio"). When the air-fuel ratio correction amount AFC is a positive value, the target air-fuel ratio becomes an air-fuel ratio (the lean air-fuel ratio in this embodiment) that is leaner than the control center air-fuel ratio. When the air-fuel ratio correction amount AFC is a negative value, the target air-fuel ratio becomes an air-fuel ratio (the rich air-fuel ratio in this embodiment) that is richer than the control center air-fuel ratio. In addition, the "control center air-fuel ratio" means an air-fuel ratio to which the air-fuel ratio correction amount AFC is added in accordance with an engine operation state, that is, an air-fuel ratio that serves as a reference ratio when the target air-fuel ratio is fluctuated in accordance with the air-fuel ratio correction amount AFC.

In an illustrated example, the air-fuel ratio correction amount AFC is set to a rich setting correction amount AFCrich (corresponds to the rich setting air-fuel ratio) in a state before time ti. In other words, the target air-fuel ratio is set to the rich air-fuel ratio, and, in conjunction with this, the output air-fuel ratio of the upstream-side air-fuel ratio sensor 40 becomes the rich air-fuel ratio. The unburned gas contained in the exhaust gas that flows into the upstream-side exhaust gas control catalyst 20 is purified in the upstream-side exhaust gas control catalyst 20, and, in conjunction with this, the oxygen storage amount OSAsc of the upstream-side exhaust gas control catalyst 20 is gradually reduced. Accordingly, the integrated excess/deficient oxygen amount ΣOEDsc is also gradually reduced. Since the exhaust gas that flows out of the upstream-side exhaust gas control catalyst 20 does not contain the unburned gas due to purification in the upstream-side exhaust gas control catalyst 20, the output air-fuel ratio AFdwn of the downstream-side air-fuel ratio sensor 41 substantially becomes the theoretical air-fuel ratio. Since the air-fuel ratio of the exhaust gas that flows into the upstream-side exhaust gas control catalyst 20 is the rich air-fuel ratio, an NOx discharge amount of the upstream-side exhaust gas control catalyst 20 substantially becomes zero.

When the oxygen storage amount OSAsc of the upstream-side exhaust gas control catalyst 20 is gradually reduced, the oxygen storage amount OSAsc approximates zero at the time $t_1$, and, in conjunction with this, some of the unburned gas that flows into the upstream-side exhaust gas control catalyst 20 is not purified in the upstream-side exhaust gas control catalyst 20 and starts flowing out therefrom. Accordingly, the output air-fuel ratio AFdwn of the downstream-side air-fuel ratio sensor 41 is gradually reduced at the time $t_1$ onward. As a result, at time $t_2$, the output air-fuel ratio AFdwn of the downstream-side air-fuel ratio sensor 41 reaches a rich determination air-fuel ratio AFrich.

In this embodiment, when the output air-fuel ratio AFdwn of the downstream-side air-fuel ratio sensor 41 becomes the rich determination air-fuel ratio AFrich or lower, the air-fuel ratio correction amount AFC is switched to a lean setting correction amount AFClean (corresponds to the lean setting air-fuel ratio) in order to increase the oxygen storage amount OSAsc. Thus, the target air-fuel ratio is switched from the rich air-fuel ratio to the lean air-fuel ratio. In addition, at this time, the integrated excess/deficient oxygen amount ΣOEDsc is reset to zero.

It should be noted that, in this embodiment, the air-fuel ratio correction amount AFC is switched after the output air-fuel ratio AFdwn of the downstream-side air-fuel ratio sensor 41 reaches the rich determination air-fuel ratio AFrich. This is because, even when the oxygen storage amount OSAsc of the upstream-side exhaust gas control catalyst 20 is sufficient, there is a case where the air-fuel ratio of the exhaust gas that flows out of the upstream-side exhaust gas control catalyst 20 slightly deviates from the theoretical air-fuel ratio. To put it the other way around, when the oxygen storage amount OSAsc of the upstream-side exhaust gas control catalyst 20 is sufficient, the rich determination air-fuel ratio is set to an air-fuel ratio that the air-fuel ratio of the exhaust gas that flows out of the upstream-side exhaust gas control catalyst 20 never reaches.

When the target air-fuel ratio is switched to the lean air-fuel ratio at the time $t_2$, the air-fuel ratio of the exhaust gas that flows into the upstream-side exhaust gas control catalyst 20 is changed from the rich air-fuel ratio to the lean air-fuel ratio. In addition, in conjunction with this, the output air-fuel ratio AFup of the upstream-side air-fuel ratio sensor 40 becomes the lean air-fuel ratio (although a delay occurs in reality from time at which the target air-fuel ratio is switched to time at which the air-fuel ratio of the exhaust gas that flows into the upstream-side exhaust gas control catalyst 20 is changed, these air-fuel ratios are changed simultaneously in the illustrated example as a matter of convenience). When the air-fuel ratio of the exhaust gas that flows into the upstream-side exhaust gas control catalyst 20 is changed to the lean air-fuel ratio at the time $t_2$, the oxygen storage amount OSAsc of the upstream-side exhaust gas control catalyst 20 is increased. In addition, in conjunction with this, the integrated excess/deficient oxygen amount ΣOEDsc is also gradually increased.

Accordingly, the air-fuel ratio of the exhaust gas that flows out of the upstream-side exhaust gas control catalyst 20 is changed to the theoretical air-fuel ratio, and the output air-fuel ratio AFdwn of the downstream-side air-fuel ratio sensor 41 is also converged to become the theoretical air-fuel ratio. At this time, the air-fuel ratio of the exhaust gas that flows into the upstream-side exhaust gas control catalyst 20 is the lean air-fuel ratio. However, since there is plenty of room for the oxygen storage capacity of the upstream-side exhaust gas control catalyst 20, oxygen in the exhaust gas that flows into the upstream-side exhaust gas control catalyst 20 is stored therein, and NOx is reduced and purified. Thus, the NOx discharge amount of the upstream-side exhaust gas control catalyst 20 substantially becomes zero.

Thereafter, if the oxygen storage amount OSAsc of the upstream-side exhaust gas control catalyst 20 is increased, the oxygen storage amount OSAsc of the upstream-side exhaust gas control catalyst 20 reaches the switching reference storage amount Cref at time $t_3$. Accordingly, the integrated excess/deficient oxygen amount ΣOEDsc reaches a switching reference value OEDref that corresponds to the switching reference storage amount Cref. In this embodiment, when the integrated excess/deficient oxygen amount ΣOEDsc becomes the switching reference value OEDref or larger, the air-fuel ratio correction amount AFC is switched to the rich setting correction amount AFCrich in order to stop storing oxygen in the upstream-side exhaust gas control catalyst 20. Thus, the target air-fuel ratio is set to the rich air-fuel ratio. In addition, at this time, the integrated excess/deficient oxygen amount ΣOEDsc is reset to zero.

Here, in the example illustrated in FIG. 5, the oxygen storage amount OSAsc is reduced at the same time as the target air-fuel ratio is switched at the time $t_3$. However, in reality, a delay occurs from time at which the target air-fuel ratio is switched to time at which the oxygen storage amount OSAsc is reduced. In addition, there is a case where the air-fuel ratio of the exhaust gas that flows into the upstream-side exhaust gas control catalyst 20 unintentionally and instantaneously deviates from the target air-fuel ratio in a significant manner, such as a case where an engine load is increased by acceleration of a vehicle, in which the internal combustion engine is mounted, and thus the intake air amount instantaneously deviates in a significant manner.

In order to handle such a problem, the switching reference storage amount Cref is set to be sufficiently smaller than a maximum oxygen storable amount Cmaxsc at time that the upstream-side exhaust gas control catalyst 20 is unused or an outflow increasing storage amount (Cuplim in FIG. 2A) in which NOx and the like are more likely to flow out rapidly. Accordingly, even when such a delay as described above occurs, or even when the actual air-fuel ratio of the exhaust gas unintentionally and instantaneously deviates from the target air-fuel ratio in the significant manner, the oxygen storage amount OSAsc does not reach the maximum oxygen storable amount Cmaxsc or the outflow increasing storage amount Cuplim. To put it the other way around, the switching reference storage amount Cref is set to an amount that is small enough to prevent the oxygen storage amount OSAsc from reaching the maximum oxygen storable amount Cmaxsc or the outflow increasing storage amount Cuplim even when such a delay as described above or unintentional deviation of the air-fuel ratio occurs. For example, the switching reference storage amount Cref is set to ¾ or smaller, preferably ½ or smaller, or further preferably ⅕ or smaller of the maximum oxygen storable amount Cmaxsc at the time that the upstream-side exhaust gas control catalyst 20 is unused.

When the target air-fuel ratio is switched to the rich air-fuel ratio at the time $t_3$, the air-fuel ratio of the exhaust gas that flows into the upstream-side exhaust gas control catalyst 20 is changed from the lean air-fuel ratio to the rich air-fuel ratio. In conjunction with this, the output air-fuel ratio AFup of the upstream-side air-fuel ratio sensor 40 becomes the rich air-fuel ratio (although a delay occurs in reality from the time at which the target air-fuel ratio is switched to the time at which the air-fuel ratio of the exhaust gas that flows into the upstream-side exhaust gas control catalyst 20 is changed, these air-fuel ratios are changed simultaneously in the illustrated example as a matter of convenience). Since the unburned gas is contained in the exhaust gas that flows into the upstream-side exhaust gas control catalyst 20, the oxygen storage amount OSAsc of the upstream-side exhaust gas control catalyst 20 is gradually reduced. At time $t_4$, similar to the time $t_1$, the output air-fuel ratio AFdwn of the downstream-side air-fuel ratio sensor 41 starts being reduced. Also, at this time, since the air-fuel ratio of the exhaust gas that flows into the upstream-side exhaust gas control catalyst 20 is the rich air-fuel ratio, the NOx discharge amount of the upstream-side exhaust gas control catalyst 20 substantially becomes zero.

Next, at time $t_5$, similar to the time $t_2$, the output air-fuel ratio AFdwn of the downstream-side air-fuel ratio sensor 41 reaches the rich determination air-fuel ratio AFrich. Accordingly, the air-fuel ratio correction amount AFC is switched to the value AFClean that corresponds to the lean setting air-fuel ratio. Thereafter, the above-described cycle from the time $t_1$ to $t_5$ is repeated.

As it can be understood from the above description, according to this embodiment, the NOx discharge amount of the upstream-side exhaust gas control catalyst 20 can constantly be suppressed. In other words, as long as the above-described control is executed, basically, the NOx discharge amount of the upstream-side exhaust gas control catalyst 20 can be substantially zero. In addition, an integrating period for computing the integrated excess/deficient oxygen amount ΣOEDsc is short. Thus, compared to a case where the integration is performed for a long period, a computation error is less likely to be generated. Therefore, discharge of NOx that is caused by the computation error of the integrated excess/deficient oxygen amount ΣOEDsc is suppressed.

In addition, in general, when the oxygen storage amount of the exhaust gas control catalyst is maintained to be constant, the oxygen storage capacity of the exhaust gas control catalyst is degraded. In other words, in order to maintain the high oxygen storage capacity of the exhaust gas control catalyst, the oxygen storage amount of the exhaust gas control catalyst needs to fluctuate. In regard to this, according to this embodiment, as shown in FIG. 5, the oxygen storage amount OSAsc of the upstream-side exhaust gas control catalyst 20 constantly fluctuates up and down. Thus, degradation of the oxygen storage capacity is suppressed.

It should be noted that, in the above embodiment, the air-fuel ratio correction amount AFC is maintained at the lean setting correction amount AFClean from the time $t_2$ to $t_3$. However, in such a period, there is no need to necessarily maintain the air-fuel ratio correction amount AFC to be constant. The air-fuel ratio correction amount AFC may be set to fluctuate, such as to be gradually reduced. Alternatively, in the period from the time $t_2$ to $t_3$, the air-fuel ratio correction amount AFC may temporarily be set to a smaller value than zero (for example, the rich setting correction amount or the like). In other words, in the period from the time $t_2$ to $t_3$, the target air-fuel ratio may temporarily be set to the rich air-fuel ratio.

Figure 6:
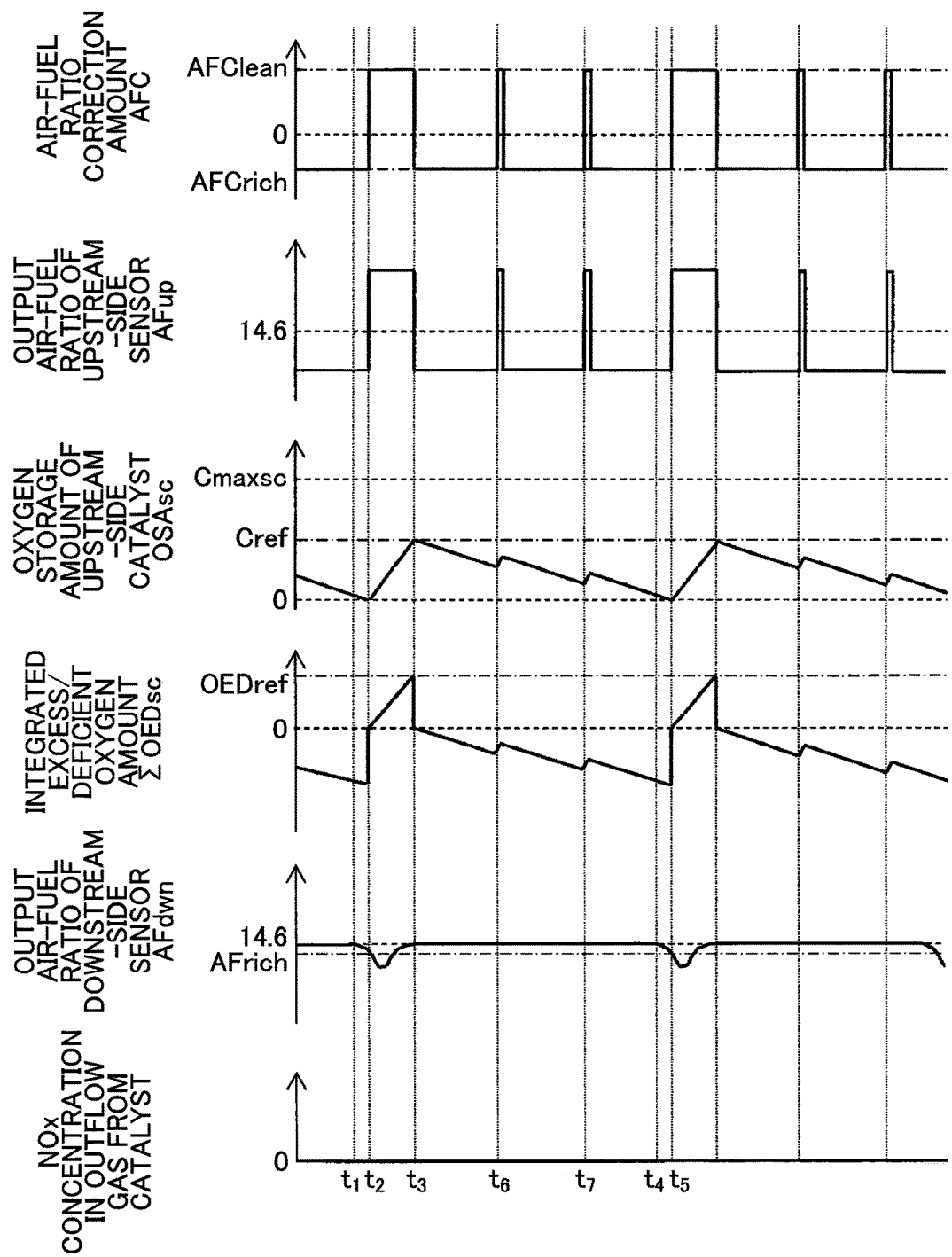
FIG. 6 is a time chart of the air-fuel ratio correction amount and the like when the air-fuel ratio control is executed.

Similarly, in the above embodiment, the air-fuel ratio correction amount AFC is maintained at the rich setting correction amount AFCrich from the time $t_3$ to $t_5$. However, in such a period, there is no need to necessarily maintain the air-fuel ratio correction amount AFC to be constant. The air-fuel ratio correction amount AFC may be set to fluctuate, such as to be gradually increased. Alternatively, as shown in FIG. 6, in the period from the time $t_3$ to $t_5$, the air-fuel ratio correction amount AFC may temporarily be set to a larger value than zero (for example, the lean setting correction amount or the like) (at time $t_6$, $t_7$, and the like in FIG. 6). In other words, in the period from the time $t_3$ to $t_5$, the target air-fuel ratio may temporarily be set to the lean air-fuel ratio.

However, also in this case, it is preferred that the air-fuel ratio correction amount AFC from the time $t_2$ to $t_3$ is set such that a difference between an average value of the target air-fuel ratio and the theoretical air-fuel ratio in said period is larger than the difference between the average value of the target air-fuel ratio and the theoretical air-fuel ratio from the time $t_3$ to $t_5$. It should be noted that the air-fuel ratio correction amount AFC from the time $t_2$ to $t_3$ may be set such that the difference between the average value of the target air-fuel ratio and the theoretical air-fuel ratio is said period is equal to or smaller than the difference between the average value of the target air-fuel ratio and the theoretical air-fuel ratio from the time $t_3$ to $t_5$.

It should be noted that such setting of the air-fuel ratio correction amount AFC in this embodiment, that is, setting of the target air-fuel ratio is performed by the ECU 31. Thus, it can be said that, in the case where the output air-fuel ratio of the downstream-side air-fuel ratio sensor 41 is the rich determination air-fuel ratio or lower, the ECU 31 continuously or intermittently sets the target air-fuel ratio of the exhaust gas that flows into the upstream-side exhaust gas control catalyst 20 to the lean air-fuel ratio until the oxygen storage amount OSAsc of the upstream-side exhaust gas control catalyst 20 becomes the switching reference storage amount Cref. It can also be said that, in the case where the oxygen storage amount OSAsc of the upstream-side exhaust gas control catalyst 20 becomes the switching reference storage amount Cref or larger, the ECU 31 continuously or intermittently sets the target air-fuel ratio to the rich air-fuel ratio until the output air-fuel ratio of the downstream-side air-fuel ratio sensor 41 becomes the rich determination air-fuel ratio or lower in a manner that the oxygen storage amount OSAsc does not reach the maximum oxygen storable amount Cmaxsc and that the output air-fuel ratio of the downstream-side air-fuel ratio sensor 41 does not reach a lean determination air-fuel ratio.

In simple terms, it can be said that, in this embodiment, the ECU 31 switches the target air-fuel ratio to the lean air-fuel ratio when the output air-fuel ratio of the downstream-side air-fuel ratio sensor 41 becomes the rich determination air-fuel ratio or lower and that the ECU 31 switches the target air-fuel ratio to the rich air-fuel ratio when the oxygen storage amount OSAsc of the upstream-side exhaust gas control catalyst 20 becomes the switching reference storage amount Cref or larger.

In addition, in the above embodiment, the integrated excess/deficient oxygen amount ΣOEDsc is computed on the basis of estimates of the output air-fuel ratio AFup of the upstream-side air-fuel ratio sensor 40 and the intake air amount into the combustion chamber 5 or the like. However, the oxygen storage amount OSAsc may be computed on the basis of another parameter in addition to these parameters, or may be computed on the basis of a parameter that differs from these parameters. Furthermore, in the above embodiment, when the integrated excess/deficient oxygen amount ΣOEDsc becomes the switching reference value OEDref or larger, the target air-fuel ratio is switched from the lean setting air-fuel ratio to the rich setting air-fuel ratio. However, timing at which the target air-fuel ratio is switched from the lean setting air-fuel ratio to the rich setting air-fuel ratio may be determined with another parameter, such as an engine operation period since the target air-fuel ratio is switched from the rich setting air-fuel ratio to the lean setting air-fuel ratio or an integrated intake air amount, being reference. Also in this case, the target air-fuel ratio has to be switched from the lean setting air-fuel ratio to the rich setting air-fuel ratio while it is estimated that the oxygen storage amount OSAsc of the upstream-side exhaust gas control catalyst 20 is smaller than the maximum oxygen storable amount Cmaxsc.

In addition, as described above, the downstream-side exhaust gas control catalyst 24 is provided in this embodiment in addition to the upstream-side exhaust gas control catalyst 20. Thus, even when the exhaust gas that contains the unburned gas flows out of the upstream-side exhaust gas control catalyst 20 at the time $t_2$ and the time $t_4$ in FIG. 5, for example, the unburned gas that has flown out is oxidized and purified in the downstream-side exhaust gas control catalyst 24. This situation is shown in FIG. 7.

Figure 7:
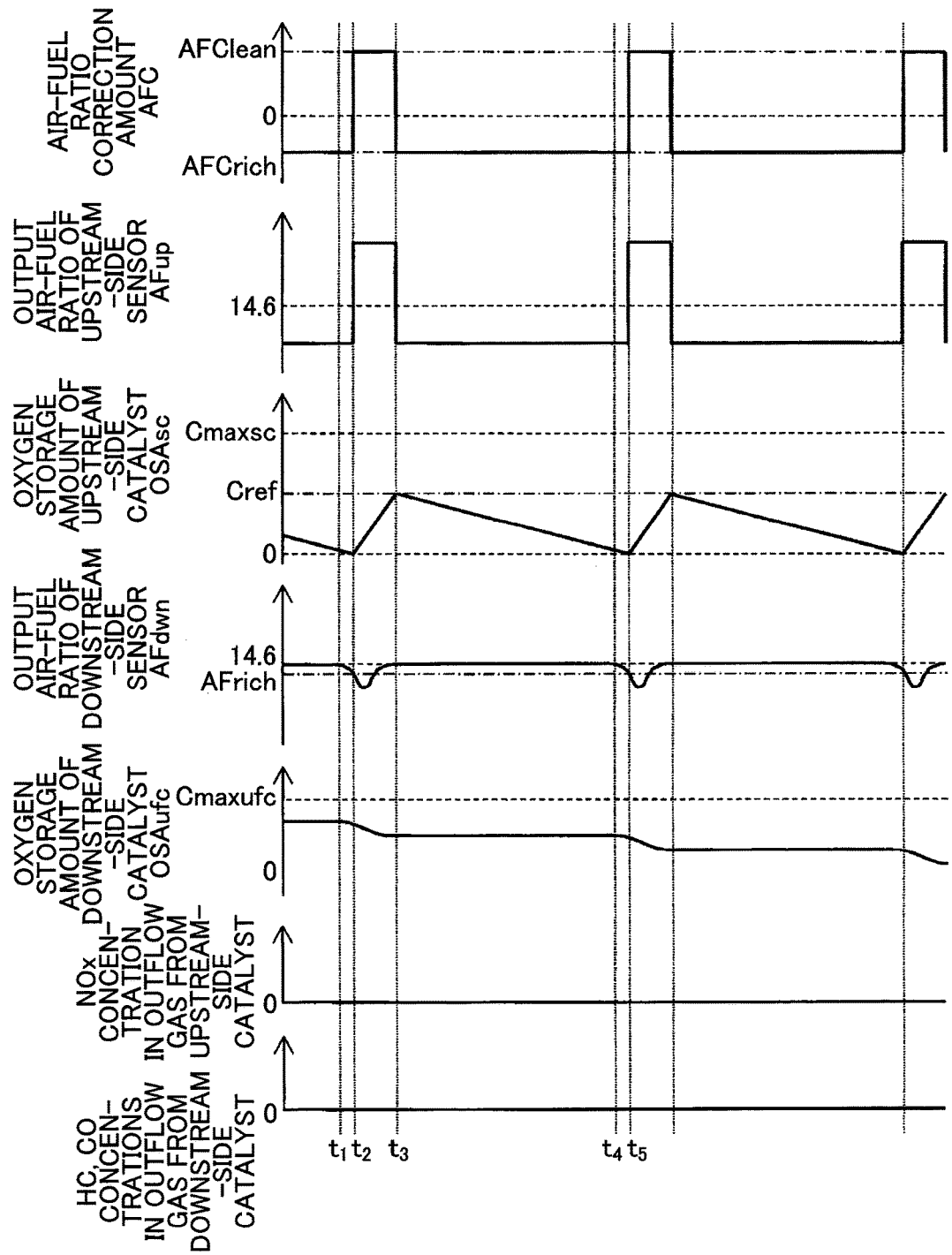
FIG. 7 is a time chart of the air-fuel ratio correction amount and the like when the air-fuel ratio control is executed.

In an example illustrated in FIG. 7, a certain amount of oxygen is stored in the downstream-side exhaust gas control catalyst 24 in a period before the time $t_1$. In addition, the air-fuel ratio of the exhaust gas that flows out of the upstream-side exhaust gas control catalyst 20 is substantially maintained at the theoretical air-fuel ratio in the period before the time $t_1$. Thus, an oxygen storage amount OSAufc of the downstream-side exhaust gas control catalyst 24 is maintained to be constant.

In the example illustrated in FIG. 7, the air-fuel ratio of the exhaust gas that flows out of the upstream-side exhaust gas control catalyst 20 later becomes the rich air-fuel ratio from the time $t_1$ to $t_3$. Thus, the exhaust gas that contains the unburned gas flows into the downstream-side exhaust gas control catalyst 24.

As described above, the certain amount of oxygen is stored in the downstream-side exhaust gas control catalyst 24 in the period before the time $t_1$. Thus, when the unburned gas is contained in the exhaust gas that flows into the upstream-side exhaust gas control catalyst 20, the unburned gas is oxidized and purified by oxygen that is stored therein. In addition, in conjunction with this, the oxygen storage amount OSAufc of the downstream-side exhaust gas control catalyst 24 is reduced. However, since the amount of the unburned gas that flows out of the upstream-side exhaust gas control catalyst 20 from the time $t_1$ to $t_3$ is not very large, a reduced amount of the oxygen storage amount OSAufc during this period is small. Accordingly, the unburned gas that flows out of the upstream-side exhaust gas control catalyst 20 from the time $t_1$ to $t_3$ is completely reduced and purified in the downstream-side exhaust gas control catalyst 24.

Similar to the case from the time $t_1$ to $t_3$, the unburned gas flows out of the upstream-side exhaust gas control catalyst 20 at certain time intervals at the time $t_4$ onward. The unburned gas that flows out just as described is basically reduced and purified by oxygen that is stored in the downstream-side exhaust gas control catalyst 24. As a result, as shown in FIG. 7, the NOx concentration in the exhaust gas that is discharged from the upstream-side exhaust gas control catalyst 20 is constantly and substantially zero, and the unburned gas concentration in the exhaust gas that is discharged from the downstream-side exhaust gas control catalyst 24 is constantly and substantially zero. As a result, basically, the NOx concentration and the unburned gas concentration in the exhaust gas that is discharged from the internal combustion engine is constantly and substantially zero.

By the way, in the case where the internal combustion engine as described above is mounted in the vehicle, fuel cut control for preventing injection of the fuel from the fuel injection valve 11 is executed even when the crankshaft and the piston 3 are in motion (that is, during operation of the internal combustion engine) during deceleration of the vehicle or the like. During such fuel cut control, the fuel supply to the combustion chamber 5 is stopped, and the air flows out of the combustion chamber 5. Thus, a large amount of oxygen flows into both of the exhaust gas control catalysts 20, 24.

For this reason, when the fuel cut control is executed, the oxygen storage amounts of both of the upstream-side exhaust gas control catalyst 20 and the downstream-side exhaust gas control catalyst 24 reach the maximum oxygen storable amount Cmaxsc. Just as described, when the oxygen storage amounts of the exhaust gas control catalysts 20, 24 reach the maximum oxygen storable amount Cmaxsc, these exhaust gas control catalysts 20, 24 can no longer store oxygen, and thus can no longer purify NOx. In view of this, after the fuel cut control is terminated, post-recovery rich control for setting the target air-fuel ratio to the rich air-fuel ratio is executed. This situation is shown in FIG. 8.

Figure 8:
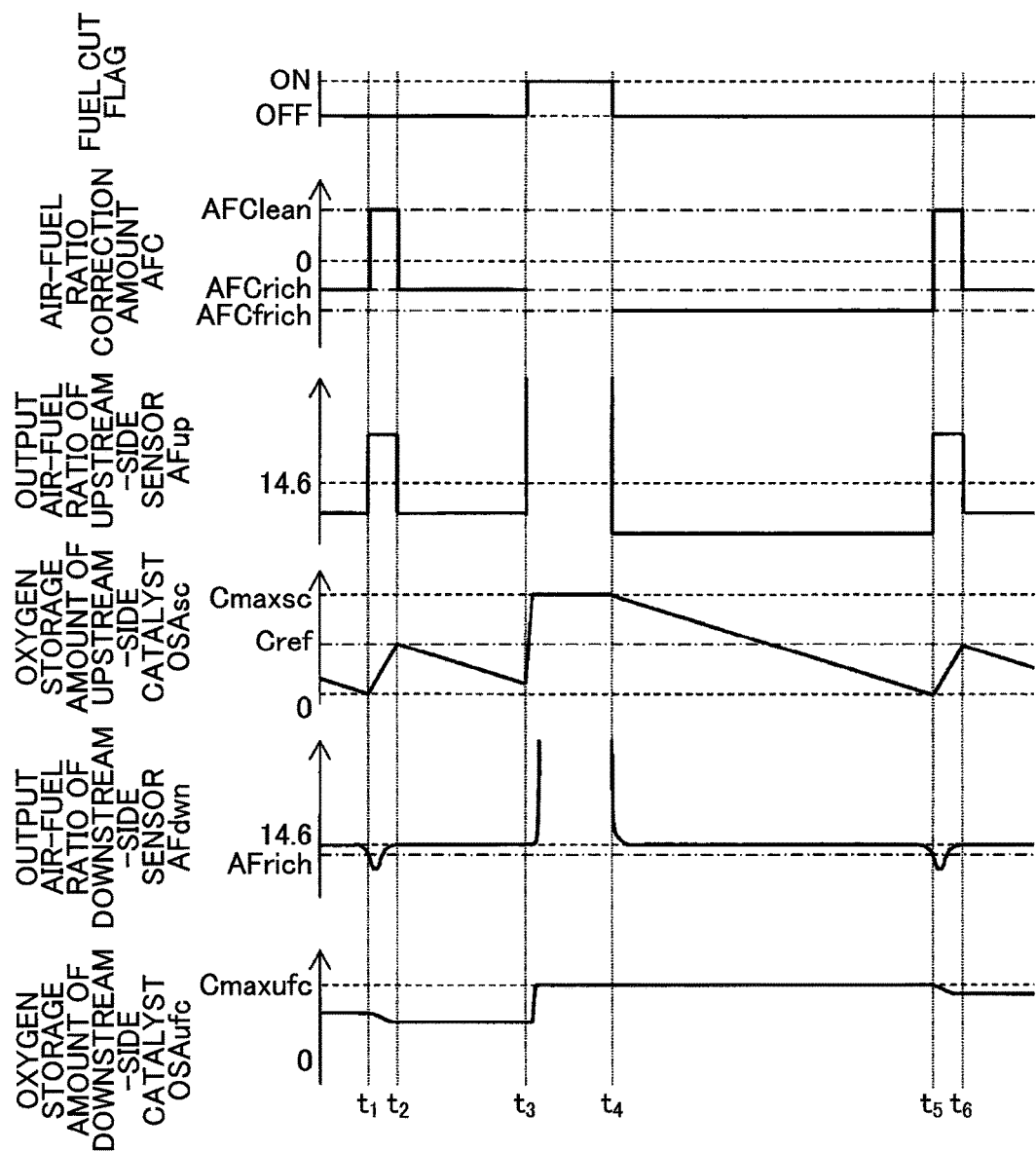
FIG. 8 is a time chart of the air-fuel ratio correction amount and the like when fuel cut control is executed.

FIG. 8 is a time chart of the air-fuel ratio correction amount and the like when the fuel cut control is executed. In an illustrated example, the fuel cut control is initiated at the time $t_3$ (a fuel cut flag ON), and the fuel cut control is terminated at the time $t_4$ (the fuel cut flag OFF). In the period before the time $t_3$, the above-described basic air-fuel ratio control is executed.

As it can be understood from FIG. 8, once the fuel cut control is initiated at the time $t_3$, the fuel injection from the fuel injection valve 11 is stopped. Thus, the value of the air-fuel ratio correction amount AFC is not set. In addition, since gas (the air) that contains the large amount of oxygen flows out of the combustion chamber 5, in conjunction with this, the output air-fuel ratio of the upstream-side air-fuel ratio sensor 40 becomes an extremely large value (the lean air-fuel ratio in the extremely large leanness degree). As a result, the gas that contains the large amount of oxygen flows into the upstream-side exhaust gas control catalyst 20, and the oxygen storage amount OSAsc thereof immediately reaches the maximum oxygen storable amount Cmaxsc.

In addition, since the gas that contains the large amount of oxygen flows into the upstream-side exhaust gas control catalyst 20, not all of the large amount of oxygen is stored in the upstream-side exhaust gas control catalyst 20, and some of oxygen flows out. Furthermore, when the oxygen storage amount OSAsc of the upstream-side exhaust gas control catalyst 20 reaches the maximum oxygen storable amount Cmaxsc, oxygen is not stored in the upstream-side exhaust gas control catalyst 20, and the gas that contains the large amount of oxygen flows out of the upstream-side exhaust gas control catalyst 20 as is. Thus, the output air-fuel ratio AFdwn of the downstream-side air-fuel ratio sensor 41 also becomes an extremely large value immediately after the fuel cut control is initiated. As a result, the gas that contains the large amount of oxygen also flows into the downstream-side exhaust gas control catalyst 24, and the oxygen storage amount OSAufc thereof immediately reaches a maximum oxygen storable amount Cmaxufc.

Thereafter, when the fuel cut control is terminated at the time $t_4$, the post-recovery rich control for setting the target air-fuel ratio to the rich air-fuel ratio is executed. In particular, in control shown in FIG. 8, the air-fuel ratio correction amount AFC is set to a post-recovery rich setting correction amount AFCfrich that corresponds to an air-fuel ratio in a greater richness degree than the rich setting correction amount AFCrich in the post-recovery rich control. In conjunction with this, the output air-fuel ratio AFup of the upstream-side air-fuel ratio sensor 40 becomes a post-recovery rich air-fuel ratio that is in the greater richness degree than the rich setting air-fuel ratio. Since the exhaust gas that contains the unburned gas flows into the upstream-side exhaust gas control catalyst 20, the oxygen storage amount OSAsc of the upstream-side exhaust gas control catalyst 20 is gradually reduced. During this period of reduction, the unburned gas is not contained in the exhaust gas that flows out of the upstream-side exhaust gas control catalyst 20 due to the purification in the upstream-side exhaust gas control catalyst 20. Accordingly, the output air-fuel ratio AFdwn of the downstream-side air-fuel ratio sensor 41 substantially becomes the theoretical air-fuel ratio, and the oxygen storage amount OSAufc of the downstream-side exhaust gas control catalyst 24 is substantially maintained at the maximum oxygen storable amount Cmaxufc.

If the oxygen storage amount OSAsc of the upstream-side exhaust gas control catalyst 20 keeps being reduced in the same manner, the oxygen storage amount OSAsc approximates zero. In conjunction with this, some of the unburned gas that flows into the upstream-side exhaust gas control catalyst 20 starts flowing out of the upstream-side exhaust gas control catalyst 20 as is. As a result, at the time $t_5$, the output air-fuel ratio AFdwn of the downstream-side air-fuel ratio sensor 41 reaches the rich determination air-fuel ratio AFrich.

In the case where the air-fuel ratio control as described above is executed, the air-fuel ratio correction amount AFC is switched to the lean setting correction amount AFClean when the output air-fuel ratio AFdwn of the downstream-side air-fuel ratio sensor 41 becomes the rich determination air-fuel ratio AFrich or lower at the time $t_5$. Thereafter, similar to the example illustrated in FIG. 5, the air-fuel ratio correction amount AFC is maintained at the lean setting correction amount AFClean until the oxygen storage amount OSAsc of the upstream-side exhaust gas control catalyst 20 reaches the switching reference storage amount Cref. Then, when the oxygen storage amount OSAsc of the upstream-side exhaust gas control catalyst 20 reaches the switching reference storage amount Cref at the time $t_6$, the air-fuel ratio correction amount AFC is switched to the rich setting correction amount AFCrich.

As described above, the unburned gas flows out of the upstream-side exhaust gas control catalyst 20 from the time $t_5$ to $t_6$. However, since the air-fuel ratio correction amount AFC is switched at the time $t_5$ that the output air-fuel ratio AFdwn of the downstream-side air-fuel ratio sensor 41 becomes the rich determination air-fuel ratio AFrich or lower, a total amount of the unburned gas that flows out from the time $t_5$ to $t_6$ is not very large. Thus, the oxygen storage amount OSAufc of the downstream-side exhaust gas control catalyst 24 is hardly reduced from the maximum oxygen storable amount Cmaxufc at the time $t_6$ that the unburned gas stops flowing out of the upstream-side exhaust gas control catalyst 20.

As long as the above-described air-fuel ratio control is executed, the exhaust gas at the lean air-fuel ratio does not basically flow out of the upstream-side exhaust gas control catalyst 20. Thus, the exhaust gas that contains NOx and oxygen does not flow out of the upstream-side exhaust gas control catalyst 20. However, there is a case where, even when the above-described air-fuel ratio control is executed, the exhaust gas that contains NOx and oxygen incidentally flows out of the upstream-side exhaust gas control catalyst 20 due to some reason. At this time, if the oxygen storage amount OSAufc of the downstream-side exhaust gas control catalyst 24 is an amount that is close to the maximum oxygen storable amount Cmaxufc, there is a case where NOx that flows out of the upstream-side exhaust gas control catalyst 20 cannot be purified sufficiently.

In view of the above, in the embodiment of the invention, the following control is executed in the post-recovery rich control that is executed after the fuel cut control is terminated. More specifically, after the fuel cut control is terminated, the target air-fuel ratio is set to the rich air-fuel ratio. Even when the output air-fuel ratio AFdwn of the downstream-side air-fuel ratio sensor 41 reaches the rich determination air-fuel ratio AFrich thereafter, the target air-fuel ratio is not switched to the lean air-fuel ratio but is temporarily maintained at the rich air-fuel ratio.

Figure 9:
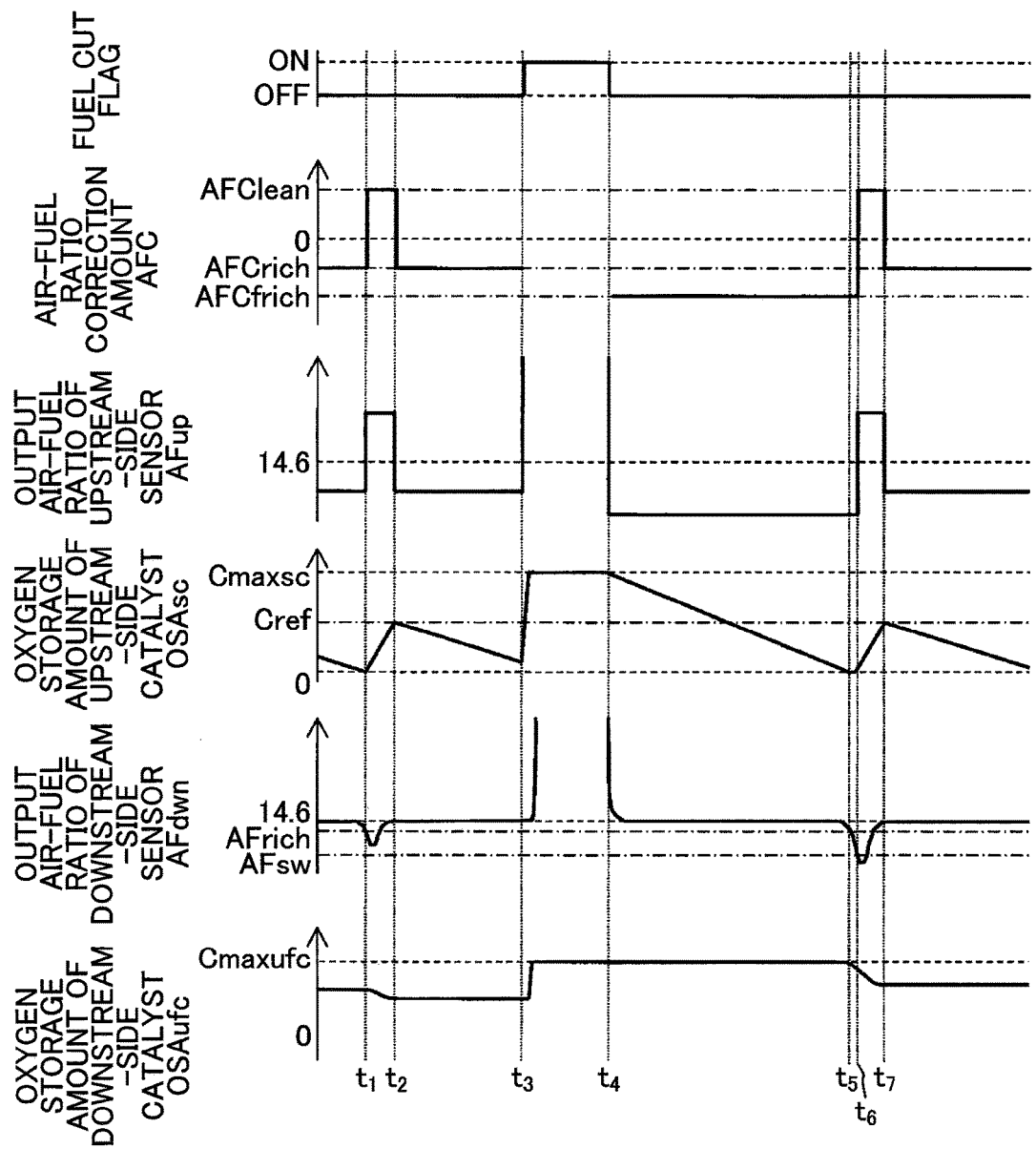
FIG. 9 is a time chart of the air-fuel ratio correction amount and the like when the fuel cut control is executed.

FIG. 9 is a time chart of the air-fuel ratio correction amount and the like when the fuel cut control is executed. Also, in an illustrated example, similar to the example illustrated in FIG. 8, the fuel cut control is initiated at the time $t_3$, and the fuel cut control is terminated at the time $t_4$.

When the fuel cut control is terminated, the air-fuel ratio correction amount AFC is set to the post-recovery rich setting correction amount AFCfrich. Accordingly, the target air-fuel ratio at this time becomes a post-recovery rich setting air-fuel ratio in a greater richness degree than the rich setting air-fuel ratio. At this time, the oxygen storage amount OSAsc of the upstream-side exhaust gas control catalyst 20 can promptly be reduced by increasing the richness degree of the target air-fuel ratio in the post-recovery rich control.

Thereafter, the output air-fuel ratio AFdwn of the downstream-side air-fuel ratio sensor 41 reaches the rich determination air-fuel ratio AFrich at the time $t_5$ due to the reduction in the oxygen storage amount OSAsc of the upstream-side exhaust gas control catalyst 20. However, in this embodiment, the air-fuel ratio correction amount AFC is not switched at the time $t_5$ but is maintained at the post-recovery rich setting correction amount AFCfrich.

In particular, in this embodiment, the air-fuel ratio correction amount AFC is maintained at the post-recovery rich setting correction amount AFCfrich until the output air-fuel ratio AFdwn of the downstream-side air-fuel ratio sensor 41 reaches a reference air-fuel ratio AFref. The reference air-fuel ratio AFref is set to an air-fuel ratio that is richer than the rich determination air-fuel ratio AFrich and that is equal to or leaner than the post-recovery rich setting air-fuel ratio (that corresponds to the post-recovery rich setting correction amount AFCfrich). Thereafter, when the output air-fuel ratio AFdwn of the downstream-side air-fuel ratio sensor 41 reaches the reference air-fuel ratio AFref at the time $t_6$, the air-fuel ratio correction amount AFC is switched to the lean setting correction amount AFClean. The above-described basic air-fuel ratio control is executed at the time to onward.

As described above, in this embodiment, the air-fuel ratio correction amount AFC is not switched to the lean setting correction amount AFClean until the output air-fuel ratio AFdwn of the downstream-side air-fuel ratio sensor 41 reaches the reference air-fuel ratio AFref that is richer than the rich determination air-fuel ratio AFrich. Thus, the exhaust gas that contains the unburned gas is discharged from the upstream-side exhaust gas control catalyst 20 for a certain period. As a result, a certain amount of the unburned gas flows into the downstream-side exhaust gas control catalyst 24. In this way, the oxygen storage amount OSAufc of the downstream-side exhaust gas control catalyst 24 can be reduced to a certain degree. Therefore, NOx purification capacity of the downstream-side exhaust gas control catalyst 24 can be secured.

Next, a description will be made on a first modification of the above embodiment with reference to FIG. 10. A configuration of the control device and control thereby in the first modification are basically the same as those in the above-described embodiment. However, in this modification, timing at which the air-fuel ratio correction amount AFC is switched from the post-recovery rich setting correction amount AFCfrich to the lean setting correction amount AFClean after the fuel cut control differs from that in the above embodiment.

Figure 10:
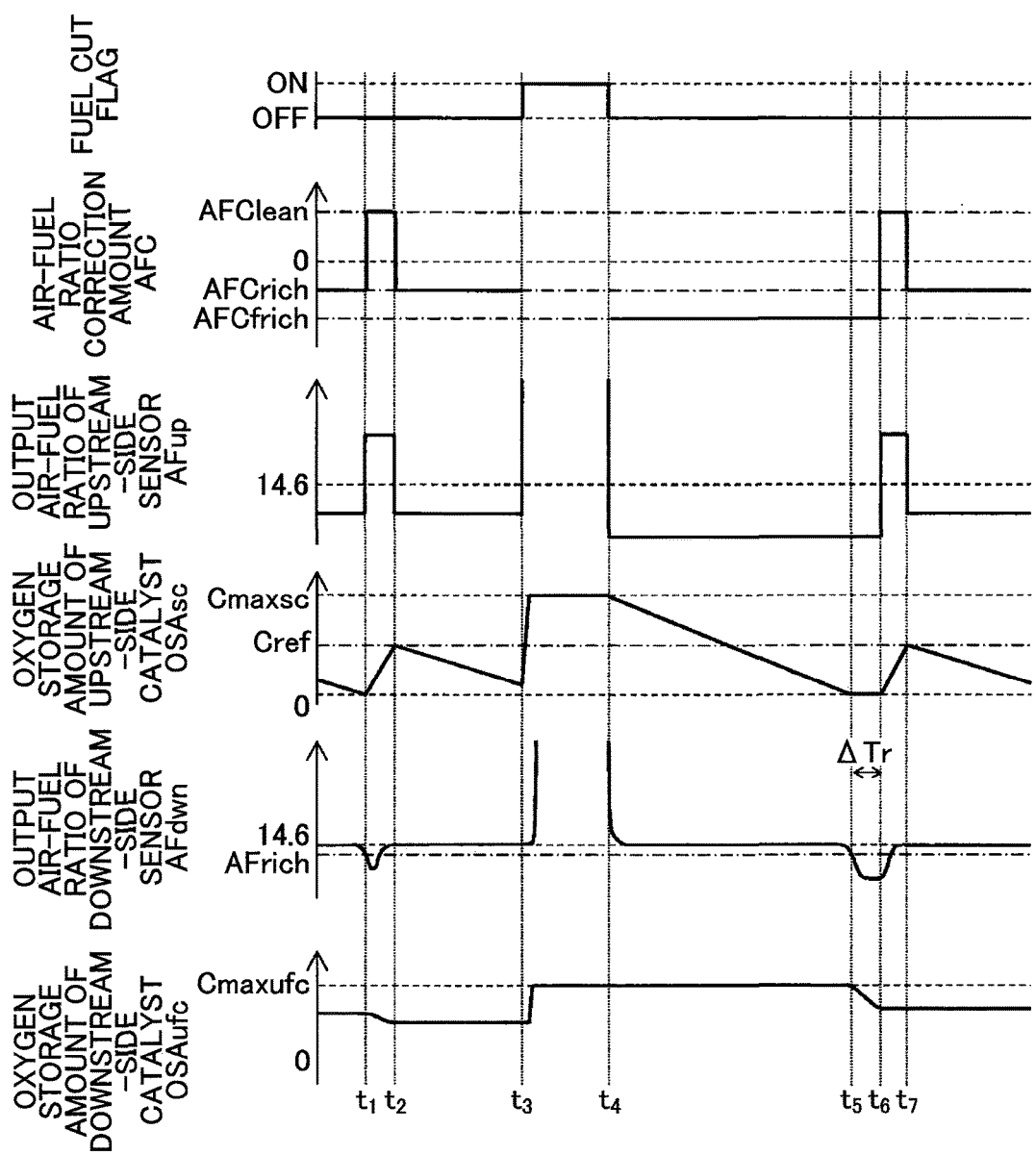
FIG. 10 is a time chart of the air-fuel ratio correction amount and the like when the fuel cut control is executed.

FIG. 10 is a time chart of the air-fuel ratio correction amount and the like when the fuel cut control is executed. Also, in an illustrated example, similar to the examples illustrated in FIG. 8 and FIG. 9, the fuel cut control is initiated at the time $t_3$, and the fuel cut control is terminated at the time $t_4$. In addition, the output air-fuel ratio AFdwn of the downstream-side air-fuel ratio sensor 41 reaches the rich determination air-fuel ratio AFrich at the time $t_5$.

Also, in this modification, the air-fuel ratio correction amount AFC is not switched at the time $t_5$ but is maintained at the post-recovery rich setting correction amount AFCfrich. Thereafter, at the time $t_6$ at which a reference elapsed period $\Delta Tr$ has elapsed since the output air-fuel ratio AFdwn of the downstream-side air-fuel ratio sensor 41 reaches the rich determination air-fuel ratio AFrich (the time $t_5$), the air-fuel ratio correction amount AFC is switched to the lean setting correction amount AFClean. The above-described basic the air-fuel ratio control is executed at the time $t_6$ onward.

The reference elapsed period $\Delta Tr$ is set such that an amount of the unburned gas that is expected to flow out of the upstream-side exhaust gas control catalyst 20 from time before the time $t_5$ to time after the time $t_6$ becomes a specified amount that is smaller than an amount corresponding to the maximum oxygen storable amount Cmaxufc of the downstream-side exhaust gas control catalyst 24. In this embodiment, the reference elapsed period $\Delta Tr$ is set to a predetermined constant value. However, the reference elapsed period ΔTr may be changed on the basis of a parameter on the operation state of the internal combustion engine. In this case, the reference elapsed period ΔTr is changed, for example, on the basis of a flow rate of the exhaust gas that is distributed to the exhaust passage (or a flow rate of the intake air), the engine load, the engine speed, or the like. At this time, for example, an amount of the unburned gas that is expected to flow out of the upstream-side exhaust gas control catalyst 20 is increased as the flow rate of the exhaust gas is increased. In this case, the reference elapsed period ΔTr is reduced.

Just as described, in this modification, the air-fuel ratio correction amount AFC is not switched to the lean setting correction amount AFClean until the reference elapsed period ΔTr elapses since the output air-fuel ratio AFdwn of the downstream-side air-fuel ratio sensor 41 reaches the rich determination air-fuel ratio AFrich. Thus, a sufficient amount of the unburned gas flows into the downstream-side exhaust gas control catalyst 24. Therefore, the NOx purification capacity of the downstream-side exhaust gas control catalyst 24 can be secured.

It should be noted that, in the first modification, an initiation point of the reference elapsed period ΔTr is set to time at which the output air-fuel ratio AFdwn of the downstream-side air-fuel ratio sensor 41 reaches the rich determination air-fuel ratio AFrich. However, a computation initiation point of the reference elapsed period ΔTr is not necessarily limited to this time. Any time can be set as the computation initiation point of the reference elapsed period ΔTr as long as it is time after the fuel cut control is terminated. For example, time after the fuel cut control is terminated (the time $t_4$ in FIG. 10) or time at which the output air-fuel ratio AFdwn of the downstream-side air-fuel ratio sensor 41 reaches a specified air-fuel ratio that differs from the rich determination air-fuel ratio AFrich may be set as the computation initiation point of the reference elapsed period ΔTr. Accordingly, in this modification, it can be said that switching time of the target air-fuel ratio to the lean air-fuel ratio is set on the basis of the elapsed period since predetermined time after the fuel cut control is terminated.

Next, a description will be made on a second modification of the above embodiment with reference to FIG. 11. A configuration of the control device and control thereby in the second modification are basically the same as those in the above embodiment and the first modification thereof. However, in this modification, timing at which the air-fuel ratio correction amount AFC is switched from the post-recovery rich setting correction amount AFCfrich to the lean setting correction amount AFClean after the fuel cut control differs from that in the above embodiment.

Figure 11:
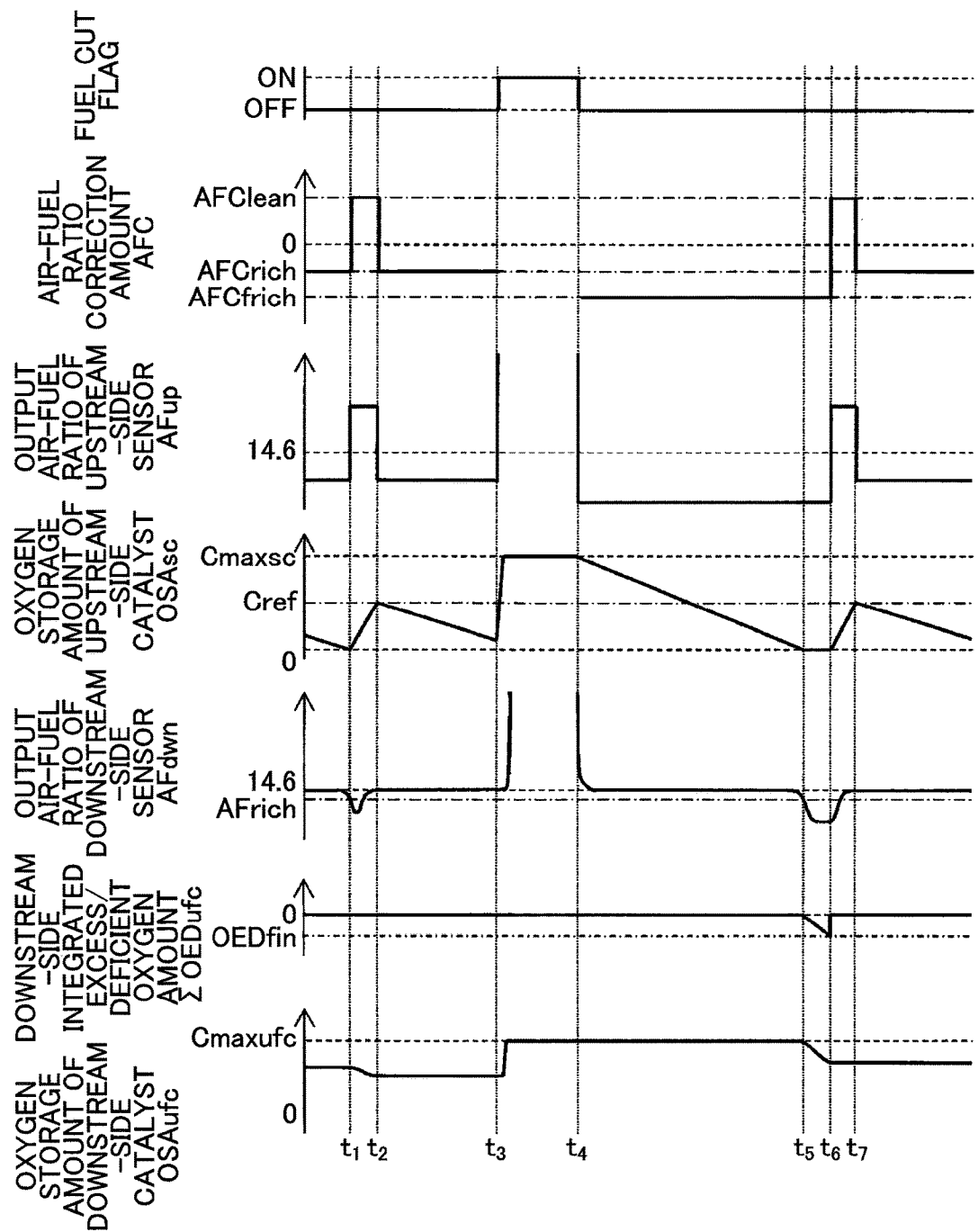
FIG. 11 is a time chart of the air-fuel ratio correction amount and the like when the fuel cut control is executed.

FIG. 11 is a time chart of the air-fuel ratio correction amount and the like when the fuel cut control is executed. Also, in an illustrated example, similar to the examples illustrated in FIG. 8 to FIG. 10, the fuel cut control is initiated at the time $t_3$, and the fuel cut control is terminated at the time $t_4$. In addition, the output air-fuel ratio AFdwn of the downstream-side air-fuel ratio sensor 41 reaches the rich determination air-fuel ratio AFrich at the time $t_5$.

Also, in this modification, the air-fuel ratio correction amount AFC is not switched at the time $t_5$ but is maintained at the post-recovery rich setting correction amount AFCfrich. Thereafter, the air-fuel ratio correction amount AFC is switched to the lean setting correction amount AFClean at the time $t_6$ that an integrated excess/deficient oxygen amount ΣOEDufc reaches a termination determination reference value OEDfin from time (the time $t_5$) at which the output air-fuel ratio AFdwn of the downstream-side air-fuel ratio sensor 41 reaches the rich determination air-fuel ratio AFrich. The above-described basic the air-fuel ratio control is executed at the time $t_6$ onward.

Here, the integrated excess/deficient oxygen amount ΣOEDufc is an integrated value of the excess/deficient oxygen amount in the exhaust gas that flows into the downstream-side exhaust gas control catalyst 24. In addition, the excess/deficient oxygen amount means the amount of oxygen that becomes excessive or deficient (the excess amount of the unburned gas and the like) when it is intended to set the air-fuel ratio of the exhaust gas that flows into the upstream-side exhaust gas control catalyst 20 to the theoretical air-fuel ratio. It should be noted that the amount of oxygen does not basically become excessive from the time $t_5$ to $t_6$ in FIG. 11. Thus, the excess/deficient oxygen amount substantially means an deficient oxygen amount when it is intended to set the air-fuel ratio of the exhaust gas to the theoretical air-fuel ratio.

The excess/deficient oxygen amount in the exhaust gas that flows into the downstream-side exhaust gas control catalyst 24 is computed on the basis of either the output air-fuel ratio of the downstream-side air-fuel ratio sensor 41 and a flow rate of the exhaust gas that is distributed to the downstream-side exhaust gas control catalyst 24 (or an estimated value of the intake air amount into the combustion chamber 5 that is computed on the basis of the output of the airflow meter 39 or the like) or the fuel supply amount from the fuel injection valve 11 or the like. More specifically, an excess/deficient oxygen amount OEDufc in the exhaust gas that flows into the downstream-side exhaust gas control catalyst is computed by the following equation (2), for example.

$$OEDufc = 0.23 \cdot Qi/(AFdwn - AFR) \quad (2)$$

In addition, the termination determination reference value OEDfin is set to a value that corresponds to a smaller amount than the maximum oxygen storable amount Cmaxufc of the downstream-side exhaust gas control catalyst 24 to a certain degree. As a result, the air-fuel ratio correction amount AFC is switched from the post-recovery rich setting correction amount AFCfrich to the lean setting correction amount AFClean in a state that a certain amount of oxygen is stored in the downstream-side exhaust gas control catalyst 24. More specifically, the termination determination reference value OEDfin is set to ½ or smaller or preferably ⅓ or smaller of the maximum oxygen storable amount Cmaxufc.

Just as described, in this modification, the air-fuel ratio correction amount AFC is not switched to the lean setting correction amount AFClean until the integrated excess/deficient oxygen amount ΣOEDufc for the downstream-side exhaust gas control catalyst 24 reaches the predetermined termination determination reference value OEDfin since the output air-fuel ratio AFdwn of the downstream-side air-fuel ratio sensor 41 reaches the rich determination air-fuel ratio AFrich. Thus, the sufficient amount of the unburned gas flows into the downstream-side exhaust gas control catalyst 24. Therefore, the NOx purification capacity of the downstream-side exhaust gas control catalyst 24 can be secured.

It should be noted that, in the above second modification, integration of the integrated excess/deficient oxygen amount ΣOEDufc for the downstream-side exhaust gas control catalyst 24 is initiated at time that the output air-fuel ratio AFdwn of the downstream-side air-fuel ratio sensor 41 reaches the rich determination air-fuel ratio AFrich. However, the integration of the integrated excess/deficient oxygen amount ΣOEDufc does not necessarily have to be initiated at this time. Any time can be set as integration initiation time of the integrated excess/deficient oxygen amount ΣOEDufc as long as it is after the fuel cut control is terminated. For example, the time after the fuel cut control is terminated (the time $t_4$ in FIG. 10) or the time at which the output air-fuel ratio AFdwn of the downstream-side air-fuel ratio sensor 41 reaches a specified air-fuel ratio that differs from the rich determination air-fuel ratio AFrich may be set as the integration initiation time of the integrated excess/ deficient oxygen amount ΣOEDufc. Accordingly, in this modification, it can be said that the switching time of the target air-fuel ratio to the lean air-fuel ratio is set on the basis of the integrated excess/deficient oxygen amount ΣOEDufc from the predetermined time after the fuel cut control is terminated.

Furthermore, in the above second modification, switching time of the air-fuel ratio correction amount AFC is determined on the basis of the integrated excess/deficient oxygen amount ΣOEDufc, which is computed on the basis of the flow rate of the exhaust gas that is distributed to the downstream-side exhaust gas control catalyst 24 and the output air-fuel ratio of the downstream-side air-fuel ratio sensor 41. However, since an average air-fuel ratio of the exhaust gas that flows out of the upstream-side exhaust gas control catalyst 20 can be estimated to a certain degree, the switching time of the air-fuel ratio correction amount AFC may be determined only on the basis of the flow rate of the exhaust gas that is distributed to the downstream-side exhaust gas control catalyst 24. In this case, when an integrated flow rate of the exhaust gas from the predetermined time after the fuel cut control is terminated reaches a predetermined termination determination reference amount, the air-fuel ratio correction amount AFC is switched from the post-recovery rich setting correction amount AFCfrich to the lean setting correction amount AFClean.

Figure 12:
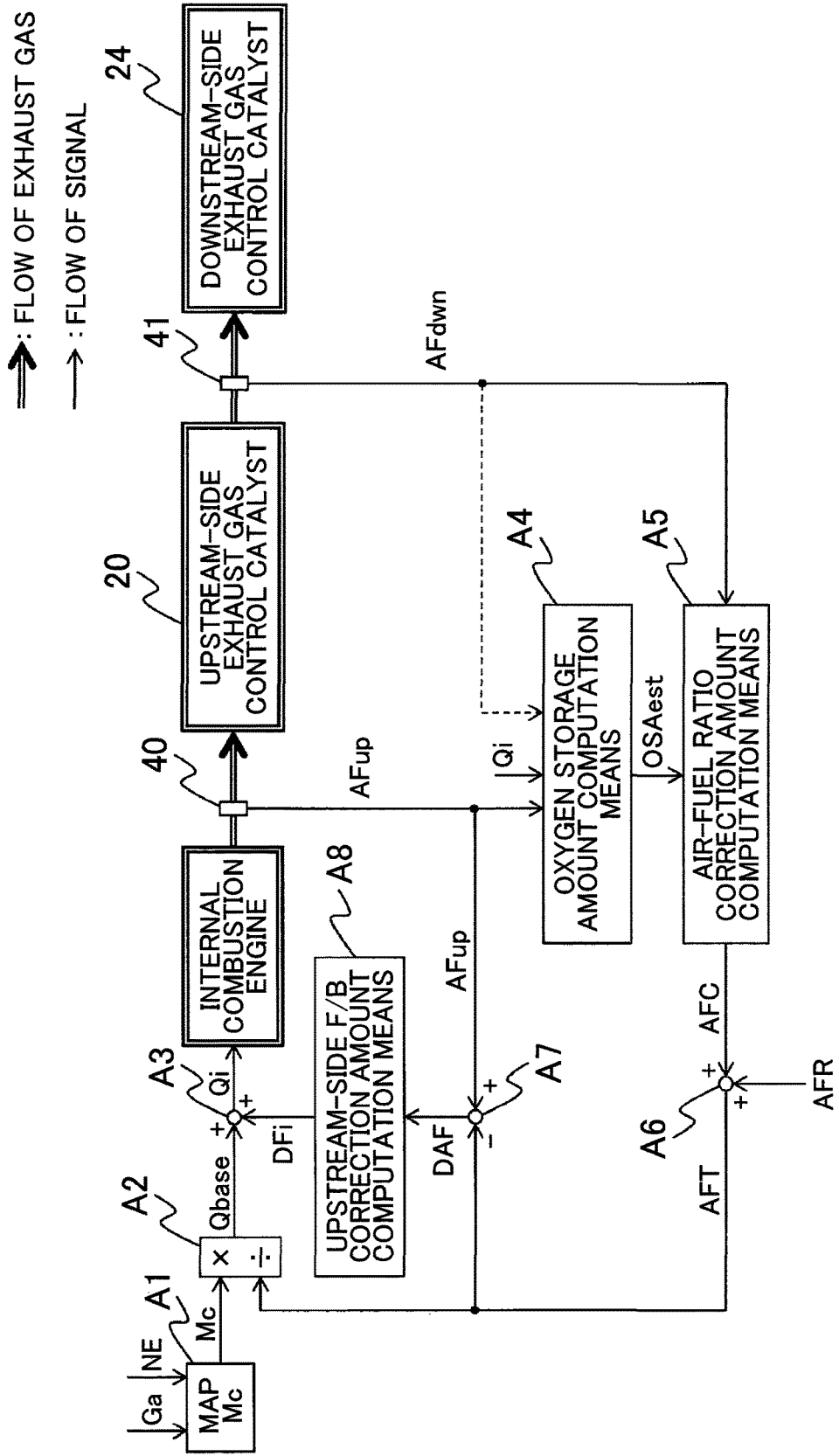
FIG. 12 is a functional block diagram of the control device.

Next, a specific description will be made on the control device in the above embodiment with reference to FIG. 12 to FIG. 14. As shown in FIG. 12 that is a functional block diagram, the control device in this embodiment is configured to include functional blocks of A1 to A8. A description will hereinafter be made on each of the functional blocks with reference to FIG. 12. An operation in each of these functional blocks A1 to A8 is basically performed by the ECU 31.

First, a description will be made on the computation of the fuel injection amount. For the computation of the fuel injection amount, in-cylinder intake air amount computation means A1, basic fuel injection amount computation means A2, and fuel injection amount computation means A3 are used.

The in-cylinder intake air amount computation means A1 computes an intake air amount Mc for the each cylinder on the basis of a flow rate of the intake air Ga, an engine speed NE, and a map or an equation stored in the ROM 34 of the ECU 31. The flow rate of the intake air Ga is measured by the airflow meter 39, and the engine speed NE is computed on the basis of the output of the crank angle sensor 44.

The basic fuel injection amount computation means A2 computes a basic fuel injection amount Qbase by dividing the in-cylinder intake air amount Mc, which is computed by the in-cylinder intake air amount computation means A1, by a target air-fuel ratio AFT (Qbase=Mc/AFT). The target air-fuel ratio AFT is computed by target air-fuel ratio setting means A6, which will be described below.

The fuel injection amount computation means A3 computes a fuel injection amount Qi by adding an F/B correction amount DFi, which will be described below, to the basic fuel injection amount Qbase, which is computed by the basic fuel injection amount computation means A2 (Qi=Qbase+DFi). An injection instruction is issued to the fuel injection valve 11 such that the fuel in the thus-computed fuel injection amount Qi is injected from the fuel injection valve 11.

Next, a description will be made on the computation of the target air-fuel ratio. For the computation of the target air-fuel ratio, excess/deficient oxygen amount computation means A4, air-fuel ratio correction amount computation means A5, and the target air-fuel ratio setting means A6 are used.

The excess/deficient oxygen amount computation means A4 computes an integrated excess/deficient oxygen amount ΣOED on the basis of the fuel injection amount Qi, which is computed by the fuel injection amount computation means A3, and the output air-fuel ratio AFup of the upstream-side air-fuel ratio sensor 40. The excess/deficient oxygen amount computation means A4 computes the integrated excess/deficient oxygen amount ΣOED, for example, by multiplying a difference between the output air-fuel ratio of the upstream-side air-fuel ratio sensor 40 and the control center air-fuel ratio by the fuel injection amount Qi and then integrating an obtained value. It should be noted that, in the case of the above second modification, the excess/deficient oxygen amount computation means A4 also computes an estimated value of the oxygen storage amount of the upstream-side exhaust gas control catalyst 20 on the basis of the fuel injection amount Qi, which is computed by the fuel injection amount computation means A3, and the output air-fuel ratio of the downstream-side air-fuel ratio sensor 41.

The air-fuel ratio correction amount computation means A5 computes the air-fuel ratio correction amount AFC of the target air-fuel ratio on the basis of the integrated excess/deficient oxygen amount ΣOED, which is computed by the excess/deficient oxygen amount computation means A4, and the output air-fuel ratio AFdwn of the downstream-side air-fuel ratio sensor 41. More specifically, the air-fuel ratio correction amount AFC is computed on the basis of a flowchart shown in FIG. 13 or FIG. 14.

The target air-fuel ratio setting means A6 computes the target air-fuel ratio AFT by adding the air-fuel ratio correction amount AFC, which is computed by the air-fuel ratio correction amount computation means A5, to the control center air-fuel ratio (the theoretical air-fuel ratio in this embodiment) AFR. The thus-computed target air-fuel ratio AFT is input to the basic fuel injection amount computation means A2 and air-fuel ratio deviation computation means A7, which will be described below.

Next, a description will be made on computation of the F/B correction amount on the basis of the output air-fuel ratio AFup of the upstream-side air-fuel ratio sensor 40. For the computation of the F/B correction amount, the air-fuel ratio deviation computation means A7 and F/B correction amount computation means A8 are used.

The air-fuel ratio deviation computation means A7 computes an air-fuel ratio deviation DAF by subtracting the target air-fuel ratio AFT, which is computed by the target air-fuel ratio setting means A6, from the output air-fuel ratio AFup of the upstream-side air-fuel ratio sensor 40 (DAF=AFup−AFT). This air-fuel ratio deviation DAF is a value for expressing excess or deficiency of the fuel supply amount with respect to the target air-fuel ratio AFT.

The F/B correction amount computation means A8 computes the F/B correction amount DFi for compensating the excess or deficiency of the fuel supply amount on the basis of the following equation (3) by performing a proportionalintegral-derivative process (a PID process) on the air-fuel ratio deviation DAF, which is computed by the air-fuel ratio deviation computation means A7. The thus-computed F/B correction amount DFi is input to the fuel injection amount computation means A3.

$$DFi = Kp \cdot DAF + Ki \cdot SDAF + Kd \cdot DDAF \quad (3)$$

It should be noted that, in the above equation (3), Kp is a proportional gain (a proportional constant) that is set in advance, Ki is an integral gain (an integral constant) that is set in advance, and Kd is a derivative gain (a derivative constant) that is set in advance. In addition, DDAF is a time differential value of the air-fuel ratio deviation DAF, and is computed by dividing a deviation between the air-fuel ratio deviation DAF that is currently updated and the air-fuel ratio deviation DAF that is updated last time by a time period that corresponds to an update interval. Furthermore, SDAF is a time integration value of the air-fuel ratio deviation DAF, and this time integration value DDAF is computed by adding the air-fuel ratio deviation DAF that is currently updated to the time integration value DDAF that is updated the last time (SDAF=DDAF+DAF).

It should be noted that, in the above embodiment, the upstream-side air-fuel ratio sensor 40 detects the air-fuel ratio of the exhaust gas that flows into the upstream-side exhaust gas control catalyst 20. However, detection accuracy of the air-fuel ratio of the exhaust gas that flows into the upstream-side exhaust gas control catalyst 20 does not necessarily have to be high. Thus, this air-fuel ratio of the exhaust gas may be estimated on the basis of the fuel injection amount from the fuel injection valve 11 and the output of the airflow meter 39, for example.

Figure 13:
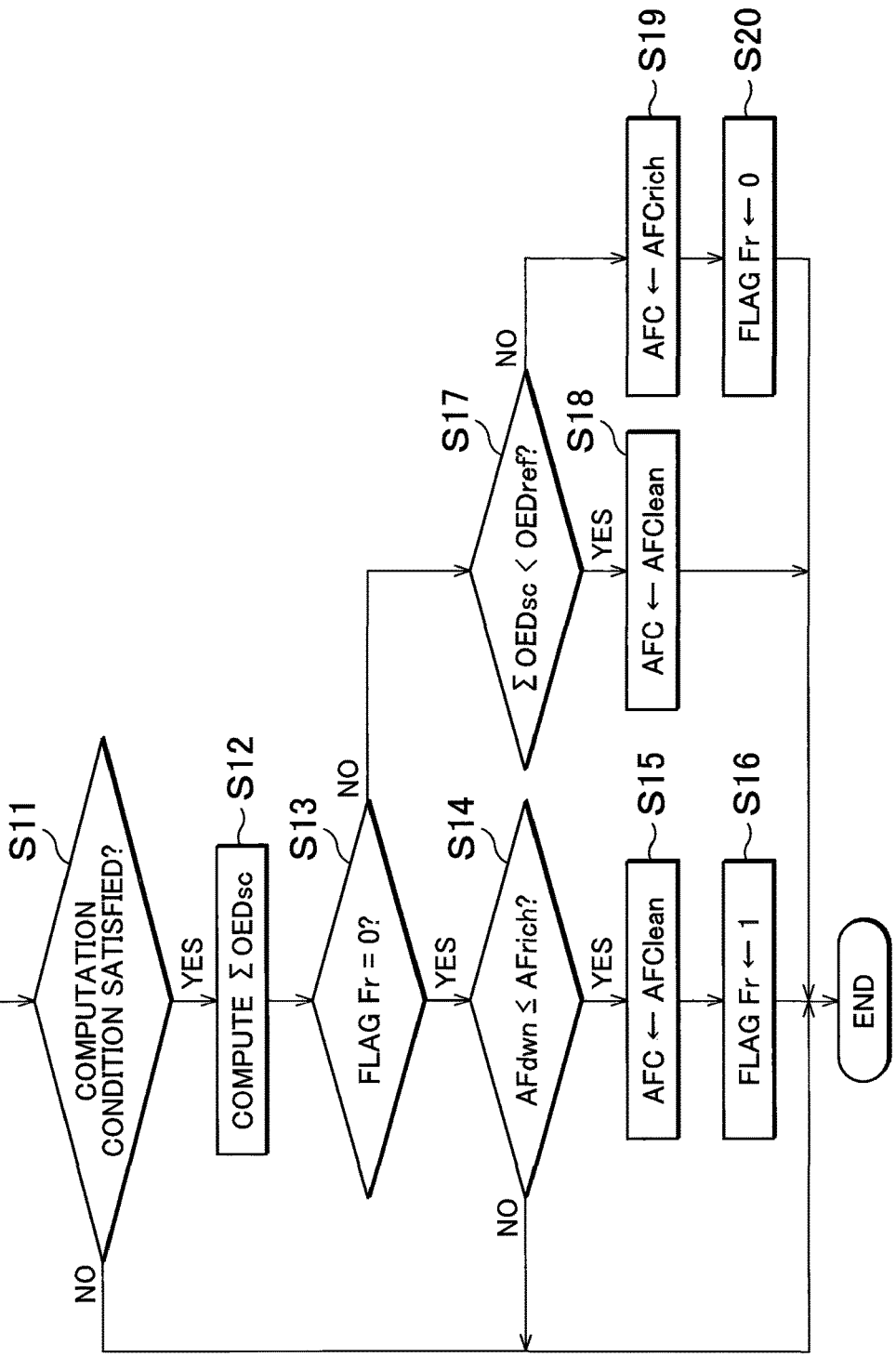
FIG. 13 is a flowchart of a control routine for computing the air-fuel ratio correction amount during normal time.

FIG. 13 is a flowchart of a control routine for computing the air-fuel ratio correction amount AFC during normal time. The illustrated control routine is executed by interruption at constant time intervals.

As shown in FIG. 13, it is first determined in step S11 whether a computation condition of the air-fuel ratio correction amount AFC is satisfied. As a case where the computation condition of the air-fuel ratio correction amount AFC is satisfied, a case where it is during normal control in which the feedback control is executed can be raised. Examples of such a case include a case where it is during the fuel cut control, a case where it is not during the post-recovery rich control, and the like. If it is determined that the computation condition of the air-fuel ratio correction amount AFC is satisfied in step S11, a process proceeds to step S12. In step S12, the integrated excess/deficient oxygen amount ΣOEDsc is computed on the basis of the output air-fuel ratio AFup of the upstream-side air-fuel ratio sensor 40 and the fuel injection amount Qi.

Next, it is determined in step S13 whether a lean setting flag Fr is set to 0. The lean setting flag Fr is set to 1 when the air-fuel ratio correction amount AFC is set to the lean setting correction amount AFClean. Except for this case, the lean setting flag Fr is set to 0. If the lean setting flag Fr is set to 0 in step S13, the process proceeds to step S14. In step S14, it is determined whether the output air-fuel ratio AFdwn of the downstream-side air-fuel ratio sensor 41 is the rich determination air-fuel ratio AFrich or lower. If it is determined that the output air-fuel ratio AFdwn of the downstream-side air-fuel ratio sensor 41 is higher than the rich determination air-fuel ratio AFrich, the control routine is terminated.

On the contrary, if the oxygen storage amount OSAsc of the upstream-side exhaust gas control catalyst 20 is reduced and thus the air-fuel ratio of the exhaust gas that flows out of the upstream-side exhaust gas control catalyst 20 is lowered, it is determined in step S14 that the output air-fuel ratio AFdwn of the downstream-side air-fuel ratio sensor 41 is the rich determination air-fuel ratio AFrich or lower. In this case, the process proceeds to step S15, and the air-fuel ratio correction amount AFC is set to the lean setting correction amount AFClean. Next, in step S16, the lean setting flag Fr is set to 1, and the control routine is terminated.

In the next routine, it is determined in step S13 that the lean setting flag Fr is not set to 0, and the process proceeds to step S17. In step S17, it is determined whether the integrated excess/deficient oxygen amount ΣOED that is computed in step S12 is smaller than a determination reference value OEDref. If it is determined that the integrated excess/deficient oxygen amount ΣOEDsc is smaller than a determination reference value OEDref, the process proceeds to step S18, and the air-fuel ratio correction amount AFC is maintained at the lean setting correction amount AFClean. On the contrary, if the oxygen storage amount of the upstream-side exhaust gas control catalyst 20 is increased, it is eventually determined in step S17 that the integrated excess/deficient oxygen amount ΣOEDsc is the determination reference value OEDref or larger, and the process proceeds to step S19. In step S19, the air-fuel ratio correction amount AFC is set to the rich setting correction amount AFCrich. Next, in step S20, the lean setting flag Fr is reset to 0, and the control routine is terminated.

FIG. 14 is a flowchart of a control routine for computing the air-fuel ratio correction amount AFC during the post-recovery rich control. The illustrated control routine is executed by the interruption at the constant time intervals.

As shown in FIG. 14, it is first determined in step S21 whether an FC flag for indicating that the fuel cut control is executed is ON. If the fuel cut control is not executed, that is, if the FC flag is OFF, the process proceeds to step S22. Next, it is determined in step S22 whether a post-recovery flag is ON. The post-recovery flag is turned ON when the post-recovery rich control is executed. Except for this case, the post-recovery flag is turned OFF. If the post-recovery rich control is not executed, that is, the post-recovery flag is OFF, the control routine is terminated. At this time, the air-fuel ratio correction amount AFC is computed on the basis of the control routine shown in FIG. 13.

On the contrary, if the fuel cut control is initiated, it is determined in step S21 of the next control routine that the FC flag is ON, and the process proceeds to step S23. In step S23, the post-recovery flag is turned ON, and the control routine is terminated. Then, after the fuel cut control is terminated, it is determined in step S21 of the next control routine that the FC flag is OFF. Thus, the process proceeds from step S21 to step S22, and it is also determined in step S22 that the post-recovery flag is ON. Then, the process proceeds to step S24.

In step S24, it is determined whether the output air-fuel ratio AFdwn of the downstream-side air-fuel ratio sensor 41 is higher (leaner) than the reference air-fuel ratio AFref. If it is determined in step S24 that the output air-fuel ratio AFdwn is higher than the reference air-fuel ratio AFref, the process proceeds to step S25, and the air-fuel ratio correction amount AFC is set to a rich setting correction amount AFCrich. On the contrary, if it is determined in step S24 that the output air-fuel ratio AFdwn is the reference air-fuel ratio AFref or lower, the process proceeds to step S26. Then, the air-fuel ratio correction amount AFC is switched to the lean setting correction amount AFClean, and the post-recovery flag is reset to OFF in step S27.

It should be noted step S24 is changed in the case of the above-described first modification and second modification. In the case of the first modification, it is determined in step S24 whether the elapsed period since the output air-fuel ratio AFdwn of the downstream-side air-fuel ratio sensor 41 reaches the reference air-fuel ratio AFref has reached the reference elapsed period ATr. Meanwhile, in the case of the second modification, it is determined in step S24 whether the integrated excess/deficient oxygen amount ΣOEDufc for the downstream-side exhaust gas control catalyst 24 has reached the termination determination reference value OEDfin since the output air-fuel ratio AFdwn of the downstream-side air-fuel ratio sensor 41 reaches the reference air-fuel ratio AFref.

Next, a description will be made on a second embodiment of the invention with reference to FIG. 15A to FIG. 17. A configuration of the control device and control thereby in the second embodiment are basically the same as those in the above first embodiment. However, in the above embodiment, the air-fuel ratio correction amount AFC is maintained at the constant post-recovery rich setting correction amount during the post-recovery rich control, and thus the target air-fuel ratio is maintained at the constant rich air-fuel ratio. On the contrary, in this embodiment, the air-fuel ratio correction amount AFC is controlled during the post-recovery rich control.

By the way, as described above, when the fuel cut control is executed, oxygen is stored in the downstream-side exhaust gas control catalyst 24 up to the maximum oxygen storable amount Cmaxufc. If the exhaust gas at the rich air-fuel ratio flows into the downstream-side exhaust gas control catalyst 24 thereafter, in conjunction with this, oxygen stored in the downstream-side exhaust gas control catalyst 24 is released, and the oxygen storage capacity of the downstream-side exhaust gas control catalyst 24 is recovered. At this time, a degree of recovery of the oxygen storage capacity of the downstream-side exhaust gas control catalyst 24 changes in accordance with a total amount of the unburned gas that flows into the downstream-side exhaust gas control catalyst 24. The oxygen storage capacity is recovered to the greater degree as the total amount of the unburned gas is increased. In addition, the degree of recovery of the oxygen storage capacity of the downstream-side exhaust gas control catalyst 24 also changes in accordance with a richness degree of the exhaust gas at the rich air-fuel ratio that flows into the downstream-side exhaust gas control catalyst 24. The oxygen storage capacity is recovered to the greater degree as the richness degree is increased. A description will hereinafter be made on this by using FIG. 15A to FIG. 16B.

FIG. 15A to FIG. 16B are views for schematically showing states that oxygen is suctioned into and released from the downstream-side exhaust gas control catalyst 24. The reference numeral 24a in the drawings indicates a partition wall 24a for constituting the downstream-side exhaust gas control catalyst 24, and the exhaust gas is distributed through a passage between these partition walls 24a. A region with hatched lines in the each drawing indicates a region in which oxygen is stored. Thus, oxygen cannot be stored in this region any more. Meanwhile, a region within the partition wall 24a without hatched lines indicates a region where oxygen is not stored. Thus, oxygen can be stored in this region.

Figure 15A:
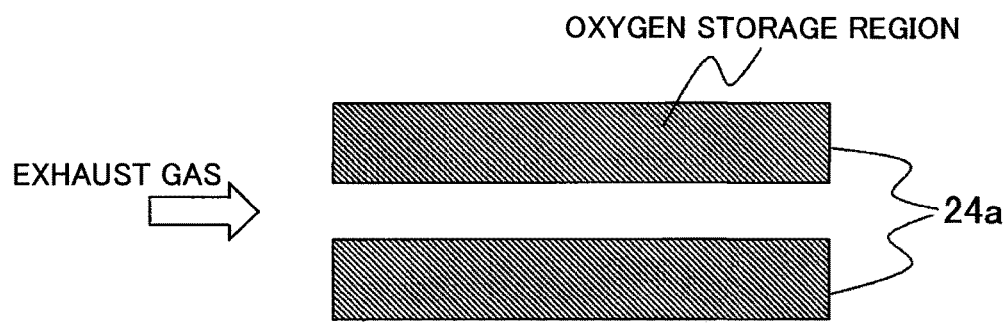
FIG. 15A is a view for schematically showing a state of a downstream-side exhaust gas control catalyst immediately after the fuel cut control is terminated.

FIG. 15A shows a state of the downstream-side exhaust gas control catalyst 24 immediately after the fuel cut control is terminated. As it can be understood from FIG. 15A, immediately after the fuel cut control is terminated, oxygen is stored in the entire region of the downstream-side exhaust gas control catalyst 24. Accordingly, oxygen cannot be stored any more in the state of FIG. 15A, and thus the oxygen storage capacity is degraded.

Figure 15B:
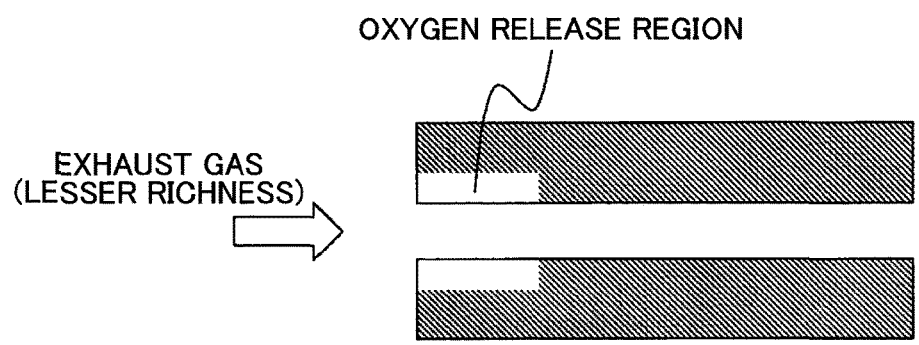
FIG. 15B is a view for schematically showing a state of the downstream-side exhaust gas control catalyst when the exhaust gas at a slightly rich air-fuel ratio flows into the downstream-side exhaust gas control catalyst.
Figure 15C:
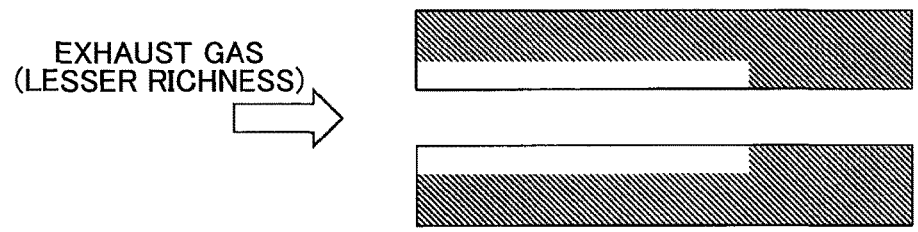
FIG. 15C is a view for schematically showing a state of the downstream-side exhaust gas control catalyst when the exhaust gas at a rich air-fuel ratio continuously flows into the downstream-side exhaust gas control catalyst.

Thereafter, if the exhaust gas at the rich air-fuel ratio to the lesser richness degree flows into the downstream-side exhaust gas control catalyst 24, as shown in FIG. 15B, oxygen stored in the downstream-side exhaust gas control catalyst 24 is gradually released from an upstream side in an exhaust gas flowing direction, and the unburned gas is thereby purified. However, if the richness degree of the exhaust gas that flows therein is small, only oxygen in the vicinity of a surface of the partition wall 24a is released. Thus, if the exhaust gas at the rich air-fuel ratio keeps flowing into the downstream-side exhaust gas control catalyst 24, as shown in FIG. 15C, the region from which oxygen is released expands to a downstream side. However, oxygen in a deep region within the partition wall 24a is not released and remains therein for the entire range of the downstream-side exhaust gas control catalyst 24.

On the contrary, FIG. 16A and FIG. 16B shows a case where the exhaust gas at the rich air-fuel ratio to the greater richness degree flows into the downstream-side exhaust gas control catalyst 24. In this case, similar to the case shown in FIG. 15B, oxygen stored in the downstream-side exhaust gas control catalyst 24 is gradually released from the upstream side in the exhaust gas flowing direction. In addition, in the case where the richness degree of the exhaust gas that flows therein is large, as it can be understood from FIG. 16A, not only oxygen in the vicinity of the surface of the partition wall 24a but also oxygen stored in the deep region within the partition wall 24a is released. Thus, if the exhaust gas at the rich air-fuel ratio in the greater richness degree keeps flowing into the downstream-side exhaust gas control catalyst 24, as shown in FIG. 16B, a state that oxygen is released even from the deep region within the partition wall 24a of the downstream-side exhaust gas control catalyst 24 expands to the downstream side.

Just as described, when oxygen is released from the deep region within the partition wall 24a of the downstream-side exhaust gas control catalyst 24, the oxygen storage capacity of the downstream-side exhaust gas control catalyst 24 is significantly recovered. In addition, in general, the exhaust gas control catalyst is at a higher temperature on the upstream side in the exhaust gas flowing direction, and thus an activity degree thereof is increased. As described above, when the exhaust gas at the rich air-fuel ratio to the greater richness degree flows into the downstream-side exhaust gas control catalyst 24, an amount of oxygen that can be stored per unit surface area is also increased on the upstream side of the exhaust gas. Thus, when the exhaust gas at the rich air-fuel ratio to the greater richness degree flows into the downstream-side exhaust gas control catalyst 24, oxygen can be suctioned into and released from the region where the activity degree is greater. Therefore, exhaust gas purification efficiency can be increased.

In view of the above, similar to the above first embodiment, even in the case where the output air-fuel ratio AFdwn of the downstream-side air-fuel ratio sensor 41 reaches the rich determination air-fuel ratio AFrich after the fuel cut control is terminated, the target air-fuel ratio is not switched to the lean air-fuel ratio in this embodiment. In particular, in this embodiment, the target air-fuel ratio is not switched to the lean air-fuel ratio at least until the output air-fuel ratio AFdwn of the downstream-side air-fuel ratio sensor 41 reaches the reference air-fuel ratio AFref that is richer than the rich determination air-fuel ratio AFrich.

In addition, in the case where the output air-fuel ratio AFdwn of the downstream-side air-fuel ratio sensor 41 does not reach the reference air-fuel ratio AFref at time that a specified waiting determination period ΔTj has elapsed since the output air-fuel ratio AFdwn of the downstream-side air-fuel ratio sensor 41 reaches the rich determination air-fuel ratio AFrich, the target air-fuel ratio is changed to an air-fuel ratio that is richer than the previous air-fuel ratio (an air-fuel ratio to the greater richness degree).

Figure 17:
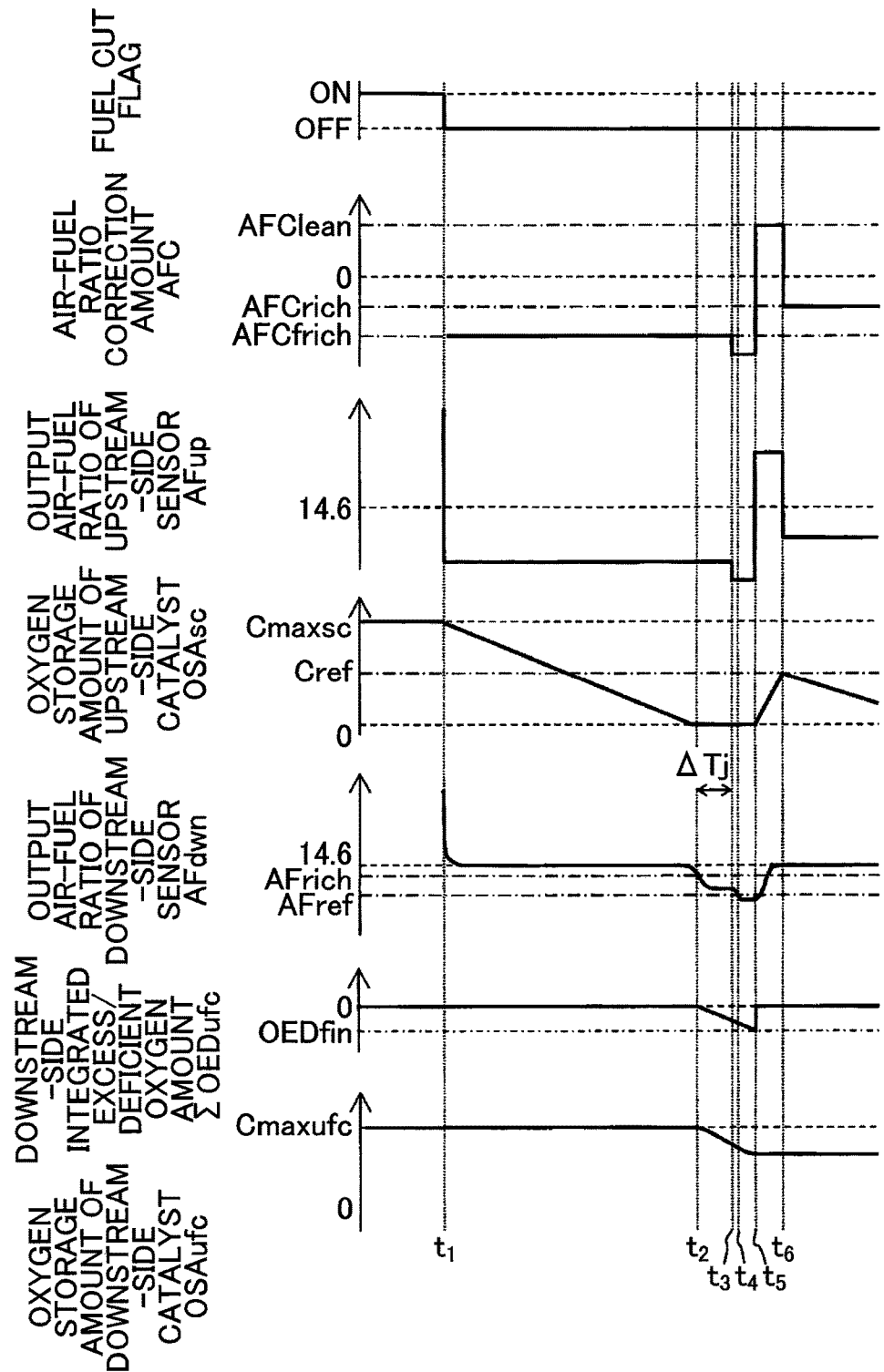
FIG. 17 is a time chart of the air-fuel ratio correction amount and the like when the fuel cut control is executed.

FIG. 17 is a time chart of the air-fuel ratio correction amount and the like when the fuel cut control is executed. In an illustrated example, the fuel cut control is terminated at the time $t_1$, and the output air-fuel ratio AFdwn of the downstream-side air-fuel ratio sensor 41 reaches the rich determination air-fuel ratio AFrich at the time $t_2$. In addition, the above-described reference air-fuel ratio AFref is set to a leaner air-fuel ratio than a rich air-fuel ratio that corresponds to the post-recovery rich setting correction amount AFCfrich.

As described above, also in this embodiment, even when the output air-fuel ratio AFdwn reaches the rich determination air-fuel ratio AFrich at the time $t_2$, the air-fuel ratio correction amount AFC is not switched and is maintained at the post-recovery rich setting correction amount AFCfrich.

In the illustrated example, the output air-fuel ratio AFdwn of the downstream-side air-fuel ratio sensor 41 is not substantially changed thereafter, and is stagnated as an air-fuel ratio on the lean side from the reference air-fuel ratio AFref. Various causes that lead to occurrence of such a phenomenon can be considered, and, for example, it is considered that the output air-fuel ratio AFup of the upstream-side air-fuel ratio sensor 40 deviates from the average air-fuel ratio of the actual exhaust gas. When the output air-fuel ratio AFup of the upstream-side air-fuel ratio sensor 40 deviates just as described, consequently, the air-fuel ratio of the exhaust gas that flows into the upstream-side exhaust gas control catalyst 20 also deviates from the theoretical air-fuel ratio. If the actual exhaust gas air-fuel ratio becomes the leaner air-fuel ratio than the reference air-fuel ratio AFref as a result of such a deviation, as shown in FIG. 17, the output air-fuel ratio AFdwn of the downstream-side air-fuel ratio sensor 41 does not reach the reference air-fuel ratio AFref.

It should be noted that the reference air-fuel ratio AFref is set as such an air-fuel ratio that allows the sufficient amount of oxygen to be released even from the deep region within the partition wall of the exhaust gas control catalyst when the exhaust gas, the air-fuel ratio of which is this air-fuel ratio or lower, flows into the exhaust gas control catalyst. More specifically, the reference air-fuel ratio AFref is, for example, about 11 to 14, preferably 11.5 to 13.5, and further preferably about 12 to 13.

In the example illustrated in FIG. 17, the output air-fuel ratio AFdwn of the downstream-side air-fuel ratio sensor 41 does not reach the reference air-fuel ratio AFref up to the time $t_3$ at which the specified waiting determination period ΔTj has elapsed since the time $t_2$. Accordingly, in this embodiment, the air-fuel ratio correction amount AFC is changed to a smaller value than the post-recovery rich setting correction amount AFCfrich at the time $t_3$. Thus, at the time $t_3$, the target air-fuel ratio is changed from the air-fuel ratio that corresponds to the post-recovery rich setting correction amount AFCfrich to an air-fuel ratio to a greater richness degree than this air-fuel ratio.

Just as described, when the richness degree of the target air-fuel ratio is increased, the output air-fuel ratio AFdwn of the downstream-side air-fuel ratio sensor 41 is changed in a rich direction. In the example illustrated in FIG. 17, the output air-fuel ratio AFdwn becomes the reference air-fuel ratio AFref or lower at the time $t_4$. Accordingly, the exhaust gas at the rich air-fuel ratio to the greater richness degree flows into the downstream-side exhaust gas control catalyst 24, and, as shown in FIG. 16A and FIG. 16B, oxygen that is stored in the deep region within the partition wall 24*a* is released. Thus, the oxygen storage capacity of the downstream-side exhaust gas control catalyst 24 can significantly be recovered.

Similar to the second modification of the above first embodiment, the integrated excess/deficient oxygen amount ΣOEDufc of the exhaust gas that flows into the downstream-side exhaust gas control catalyst 24 from the time $t_2$ is also computed in this embodiment. In the example illustrated in FIG. 17, the integrated excess/deficient oxygen amount ΣOEDufc in the downstream-side exhaust gas control catalyst 24 reaches the termination determination reference value OEDfin at the time $t_5$, and the air-fuel ratio correction amount AFC is switched to the lean setting correction amount AFClean. Then, the above-described basic air-fuel ratio control is executed at the time $t_5$ onward.

It should be noted that, in the above embodiment, the target air-fuel ratio is changed in the case where the output air-fuel ratio AFdwn does not reach the reference air-fuel ratio AFref at the time that the specified waiting determination period ΔTj has elapsed since the time $t_2$ that the output air-fuel ratio AFdwn of the downstream-side air-fuel ratio sensor 41 has reached the rich determination air-fuel ratio AFrich. This waiting determination period ΔTj may be a predetermined constant value or may be changed on the basis of the parameter on the operation state of the internal combustion engine like the above-described reference elapsed period ΔTr.

In addition, change timing of the target air-fuel ratio may be determined on the basis of a parameter other than the elapsed period since the time $t_2$. For example, the target air-fuel ratio may be changed to one on the rich side, for example, when the integrated excess/deficient oxygen amount from the time $t_2$, the integrated flow rate of the exhaust gas from the time $t_2$, or the like becomes a specified waiting determination amount that is determined in advance or larger. Furthermore, the initiation point at which the elapsed period and the like are measured is the time $t_2$ in the above embodiment; however, the initiation point is not necessarily limited to this time. Similar to the modifications of the above first embodiment, any time after the fuel cut control is terminated can be set as the initiation point, and the time that the output air-fuel ratio AFdwn of the downstream-side air-fuel ratio sensor 41 reaches the reference air-fuel ratio AFref can be set as the initiation point.

Moreover, in the above embodiment, the target air-fuel ratio is changed only once when the specified waiting determination period ΔTj has elapsed since the time $t_2$ or the like. However, the target air-fuel ratio may be changed multiple times in a stepwise manner on the basis of the elapsed period since the time $t_2$ or the like. Alternatively, the target air-fuel ratio may gradually be reduced at the time $t_2$ onward or time at which a specified period has elapsed since the time $t_2$ or the like onward.

Next, a description will be made on a third embodiment of the invention with reference to FIG. 18. A configuration of the control device and control thereby in the third embodiment are basically the same as those in the above second embodiment. However, in the third embodiment, when the output air-fuel ratio AFdwn of the downstream-side air-fuel ratio sensor 41 becomes the reference air-fuel ratio AFref or lower, the target air-fuel ratio is changed to one on the lean side.

By the way, as described above, in the above embodiment, the air-fuel ratio correction amount AFC is set to the post-recovery rich setting correction amount AFCfrich that is smaller than the rich setting correction amount AFCrich in the post-recovery rich control, so as to promptly reduce the oxygen storage amount OSAsc of the upstream-side exhaust gas control catalyst 20. In other words, the target air-fuel ratio is set to the post-recovery rich setting air-fuel ratio that is in the greater richness degree than the rich setting air-fuel ratio.

Meanwhile, as shown in FIG. 16A and FIG. 16B, the exhaust gas at the rich air-fuel ratio to the greater richness degree needs to flow into the downstream-side exhaust gas control catalyst 24 from a perspective of releasing oxygen that is stored in the deep region within the partition wall 24a of the downstream-side exhaust gas control catalyst 24. However, once the richness degree of the exhaust gas that flows into the downstream-side exhaust gas control catalyst 24 reaches the certain richness degree, oxygen that is stored in the deep region within the partition wall 24a can sufficiently be released. Thus, even when the richness degree of the exhaust gas that flows into the downstream-side exhaust gas control catalyst 24 is set to be greater than this certain constant richness degree, effects obtained by these richness degrees hardly differ from a perspective of releasing oxygen that is stored in the deep region within the partition wall 24a of the downstream-side exhaust gas control catalyst 24. In addition, depending on the setting of the post-recovery rich setting correction amount AFCfrich, this certain constant richness degree is less than the richness degree that corresponds to the post-recovery rich setting correction amount AFCfrich. In other words, from such a perspective, the target air-fuel ratio may be set to the air-fuel ratio on the lean side from the air-fuel ratio that corresponds to the post-recovery rich setting correction amount AFCfrich.

In view of the above, in this embodiment, in the case where the output air-fuel ratio AFdwn of the downstream-side air-fuel ratio sensor 41 reaches the reference air-fuel ratio AFref for the first time after the fuel cut control is terminated, the air-fuel ratio correction amount AFC is changed to a larger value than the post-recovery rich setting correction amount AFCfrich. More specifically, when the output air-fuel ratio AFdwn reaches the reference air-fuel ratio AFref for the first time, the target air-fuel ratio is set to the rich air-fuel ratio that is leaner than the previous air-fuel ratio (the air-fuel ratio that corresponds to the rich setting correction amount AFCrich).

Figure 18:
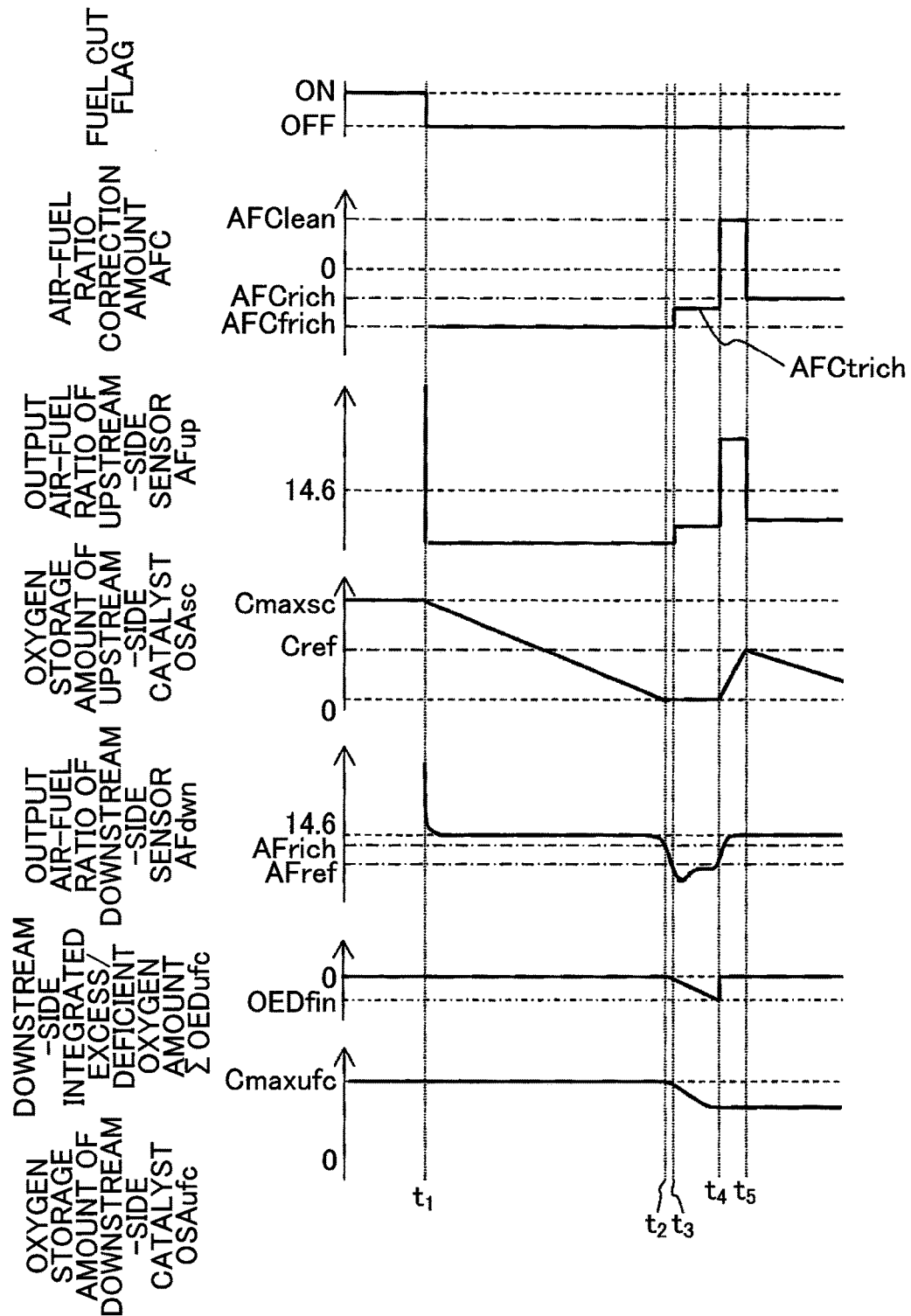
FIG. 18 is a time chart of the air-fuel ratio correction amount and the like when the fuel cut control is executed.

FIG. 18 is a time chart of the air-fuel ratio correction amount and the like when the fuel cut control is executed. In an illustrated example, the fuel cut control is terminated at the time $t_1$, and the output air-fuel ratio AFdwn of the downstream-side air-fuel ratio sensor 41 reaches the rich determination air-fuel ratio AFrich at the time $t_2$. However, also in this embodiment, the air-fuel ratio correction amount AFC is not switched at the time $t_2$, and is maintained at the post-recovery rich setting correction amount AFCfrich.

In the illustrated example, thereafter, the output air-fuel ratio AFdwn of the downstream-side air-fuel ratio sensor 41 reaches the reference air-fuel ratio AFref at the time $t_3$. In this embodiment, when the output air-fuel ratio AFdwn reaches the reference air-fuel ratio AFref, the air-fuel ratio correction amount AFC is changed to a transitional rich setting correction amount AFCtrich that is larger than the post-recovery rich setting correction amount AFCfrich. However, the transitional rich setting correction amount AFCtrich is set to a smaller value than the correct amount that corresponds to the reference air-fuel ratio AFref. In other words, the air-fuel ratio that corresponds to the transitional rich setting correction amount AFCtrich is set to the air-fuel ratio that is richer than the reference air-fuel ratio AFref.

Just as described, if the air-fuel ratio correction amount AFC is changed to the transitional rich setting correction amount AFCtrich at the time $t_3$, in conjunction with this, the output air-fuel ratio AFup of the upstream-side air-fuel ratio sensor 40 becomes the rich air-fuel ratio that is leaner than the previous air-fuel ratio. In addition, the output air-fuel ratio AFdwn of the downstream-side air-fuel ratio sensor 41 is increased (changed to the rich side) slightly after the time $t_3$. However, since the transitional rich setting correction amount AFCtrich is set to a smaller value than the correction amount that corresponds to the reference air-fuel ratio AFref, the output air-fuel ratio AFdwn is also maintained to be lower than the reference air-fuel ratio AFref. As a result, as shown in FIG. 16A and FIG. 16B, at the air-flow ratio of the exhaust gas that flows into the downstream-side exhaust gas control catalyst 24, oxygen that is stored in the deep region within the partition wall 24a can be released.

Also, in this embodiment, similar to the second modification of the above first embodiment, the integrated excess/deficient oxygen amount ΣOEDufc of the exhaust gas that flows into the downstream-side exhaust gas control catalyst 24 from the time $t_2$ is computed. In the example illustrated in FIG. 18, the integrated excess/deficient oxygen amount ΣOEDufc in the downstream-side exhaust gas control catalyst 24 reaches the termination determination reference value OEDfin at the time $t_4$, and the air-fuel ratio correction amount AFC is switched to the lean setting correction amount AFClean. The above-described basic air-fuel ratio control is executed at the time $t_4$ onward.

According to this embodiment, the target air-fuel ratio is set to the air-fuel ratio that corresponds to the transitional rich setting correction amount AFCtrich at the time $t_3$ onward. Accordingly, while oxygen that is stored in the deep region of the downstream-side exhaust gas control catalyst 24 is released, the richness degree of the air-fuel ratio of the exhaust gas that flows into the downstream-side exhaust gas control catalyst 24 can be suppressed to be low. Thus, it is possible to suppress the unburned gas in the exhaust gas from flowing through the downstream-side exhaust gas control catalyst 24 and thus to suppress the unburned gas from being discharged from the downstream-side exhaust gas control catalyst 24.

What is claimed is:

1. A control device for an internal combustion engine, the internal combustion engine including an upstream-side exhaust gas control catalyst, a downstream-side exhaust gas control catalyst, and a downstream-side air-fuel ratio sensor, the upstream-side exhaust gas control catalyst arranged in an exhaust passage of the internal combustion engine, the downstream-side exhaust gas control catalyst arranged downstream of the upstream-side exhaust gas control catalyst in an exhaust gas flowing direction in the exhaust passage of the internal combustion engine, the upstream-side exhaust gas control catalyst and the downstream-side exhaust gas control catalyst configured to store oxygen, the downstream-side air-fuel ratio sensor arranged downstream of the upstream-side exhaust gas control catalyst in the exhaust gas flowing direction and upstream of the downstream-side exhaust gas control catalyst in the exhaust gas flowing direction in the exhaust passage, the downstream-side air-fuel ratio sensor configured to output a value of an air-fuel ratio of exhaust gas that flows out of the upstream-side exhaust gas control catalyst, the control device comprising:
an electronic control unit configured to:
(a) control a fuel supply amount supplied to a combustion chamber of the internal combustion engine such that an air-fuel ratio of the exhaust gas that flows into the upstream-side exhaust gas control catalyst becomes a target air-fuel ratio;
(b) set the target air-fuel ratio to a lean air-fuel ratio that is leaner than a theoretical air-fuel ratio from at a time which an output air-fuel ratio of the downstream-side air-fuel ratio sensor becomes a rich determination air-fuel ratio or lower, the rich determination air-fuel ratio being richer than the theoretical air-fuel ratio, to a time which an oxygen storage amount of the upstream-side exhaust gas control catalyst becomes a specified switching reference storage amount or larger, the specified switching reference storage amount being smaller than a maximum oxygen storable amount, and set the target air-fuel ratio to a rich air-fuel ratio that is richer than the theoretical air-fuel ratio after the oxygen storage amount of the upstream-side exhaust gas control catalyst becomes the specified switching reference storage amount or larger; and
(c) set the target air-fuel ratio to the rich air-fuel ratio from a time which fuel cut control for terminating fuel supply to the combustion chamber during operation of the internal combustion engine is terminated to a time which the output air-fuel ratio of the downstream-side air-fuel ratio sensor becomes the rich determination air-fuel ratio or lower, temporarily set the target air-fuel ratio to the rich air-fuel ratio after the output air-fuel ratio of the downstream-side air-fuel ratio sensor becomes the rich determination air-fuel ratio or lower, and thereafter set the target air-fuel ratio to the lean air-fuel ratio,
wherein,
after the fuel cut control is terminated, the electronic control unit is configured to set the target air-fuel ratio to the rich air-fuel ratio until the output air-fuel ratio of the downstream-side air-fuel ratio sensor that has become the rich determination air-fuel ratio or lower becomes a reference air-fuel ratio that is richer than the rich determination air-fuel ratio.

2. The control device according to claim 1, wherein, after the fuel cut control is terminated, the electronic control unit is configured to change the target air-fuel ratio to a richer air-fuel ratio than the air-fuel ratio during a period when the output air-fuel ratio of the downstream-side air-fuel ratio sensor does not become the reference air-fuel ratio or lower until the output air-fuel ratio of the downstream-side air-fuel ratio sensor reaches the rich determination air-fuel ratio.

3. The control device according to claim 1, wherein, after the fuel cut control is terminated, the electronic control unit is configured to change, when the output air-fuel ratio of the downstream-side air-fuel ratio sensor becomes the reference air-fuel ratio or lower for the first time, the target air-fuel ratio to an air-fuel ratio that is leaner than an air-fuel ratio before the output air-fuel ratio of the downstream-side air-fuel ratio sensor becomes the reference air-fuel ratio or lower for the first time and that is richer than the theoretical air-fuel ratio.

4. The control device according to claim 3, wherein the rich air-fuel ratio after a change is a richer air-fuel ratio than the reference air-fuel ratio.

5. The control device according to claim 1, wherein, after the fuel cut control is terminated, the electronic control unit is configured to set a time which the target air-fuel ratio is switched to the lean air-fuel ratio after temporarily setting the target air-fuel ratio to the rich air-fuel ratio on the basis of an elapsed period from a predetermined time after the fuel cut control is terminated.

6. The control device according to claim 1, wherein, after the fuel cut control is terminated, the electronic control unit is configured to set a time which the target air-fuel ratio is switched to the lean air-fuel ratio after temporarily setting the target air-fuel ratio to the rich air-fuel ratio on the basis of an integrated flow rate of the exhaust gas in the downstream-side exhaust gas control catalyst from a predetermined time after the fuel cut control is terminated.

7. The control device according to claim 1, wherein, after the fuel cut control is terminated, the electronic control unit is configured to set a time which the target air-fuel ratio is switched to the lean air-fuel ratio after temporarily setting the target air-fuel ratio to the rich air-fuel ratio on the basis of an integrated deficient oxygen amount in the exhaust gas that flows into the downstream-side exhaust gas control catalyst from predetermined time after the fuel cut control is terminated.

8. The control device according to claim 1, wherein the target air-fuel ratio as the rich air-fuel ratio that is set after the fuel cut control is terminated is a richer air-fuel ratio than the target air-fuel ratio as the rich air-fuel ratio that is set after the oxygen storage amount becomes the specified switching reference storage amount or larger.

9. A control device for an internal combustion engine, the internal combustion engine including an upstream-side exhaust gas control catalyst, a downstream-side exhaust gas control catalyst, and a downstream-side air-fuel ratio sensor, the upstream-side exhaust gas control catalyst arranged in an exhaust passage of the internal combustion engine, the downstream-side exhaust gas control catalyst arranged downstream of the upstream-side exhaust gas control catalyst in an exhaust gas flowing direction in the exhaust passage of the internal combustion engine, the upstream-side exhaust gas control catalyst and the downstream-side exhaust gas control catalyst configured to store oxygen, the downstream-side air-fuel ratio sensor arranged downstream of the upstream-side exhaust gas control catalyst in the exhaust gas flowing direction and upstream of the downstream-side exhaust gas control catalyst in the exhaust gas flowing direction in the exhaust passage, the downstream-side air-fuel ratio sensor configured to output a value of an air-fuel ratio of exhaust gas that flows out of the upstream-side exhaust gas control catalyst, the control device comprising:
an electronic control unit configured to:
(d) control a fuel supply amount supplied to a combustion chamber of the internal combustion engine such that an air-fuel ratio of the exhaust gas that flows into the upstream-side exhaust gas control catalyst becomes a target air-fuel ratio;
(e) alternately set the target air-fuel ratio to a rich air-fuel ratio that is richer than a theoretical air-fuel ratio and to a lean air-fuel ratio that is leaner than the theoretical air-fuel ratio when an output air-fuel ratio of the downstream-side air-fuel ratio sensor exceeds a rich determination air-fuel ratio that is richer than the theoretical air-fuel ratio, and set the target air-fuel ratio to the lean air-fuel ratio; and
(f) set the target air-fuel ratio to the rich air-fuel ratio from a time which fuel cut control for terminating fuel supply to the combustion chamber during operation of the internal combustion engine is terminated to a time which the output air-fuel ratio of the downstream-side air-fuel ratio sensor becomes a reference air-fuel ratio or lower, said reference air-fuel ratio being richer than the rich determination air-fuel ratio.

10. The control device according to claim 9, wherein, after the fuel cut control is terminated, the electronic control unit is configured to change the target air-fuel ratio to a richer air-fuel ratio than an air-fuel ratio during a period when the output air-fuel ratio of the downstream-side air-fuel ratio sensor does not become the reference air-fuel ratio or lower until the output air-fuel ratio of the downstream-side air-fuel ratio sensor reaches the rich determination air-fuel ratio.

11. The control device according to claim 9, wherein, after the fuel cut control is terminated, the electronic control unit is configured to change, when the output air-fuel ratio of the downstream-side air-fuel ratio sensor becomes the reference air-fuel ratio or lower for the first time, the target air-fuel ratio to an air-fuel ratio that is leaner than an air-fuel ratio before the output air-fuel ratio of the downstream-side air-fuel ratio sensor becomes the reference air-fuel ratio or lower for the first time and that is richer than the theoretical air-fuel ratio.

12. The control device according to claim 11, wherein the rich air-fuel ratio after a change is a richer air-fuel ratio than the reference air-fuel ratio.

13. The control device according to claim 9, wherein the target air-fuel ratio as the rich air-fuel ratio that is set after the fuel cut control is terminated is a richer air-fuel ratio than the target air-fuel ratio as the rich air-fuel ratio that is set alternately with the lean air-fuel ratio.

* * * * *